US012576864B2

(12) United States Patent
Eiras et al.

(10) Patent No.: US 12,576,864 B2
(45) Date of Patent: Mar. 17, 2026

(54) TOOLS FOR PERFORMANCE TESTING AND/OR TRAINING AUTONOMOUS VEHICLE PLANNERS

(71) Applicant: Five AI Limited, Bristol (GB)

(72) Inventors: Francisco Eiras, Bristol (GB); Majd Hawasly, Edinburgh (GB); Subramanian Ramamoorthy, Edinburgh (GB)

(73) Assignee: Five AI Limited, Cambridge (GB)

( * ) Notice: Subject to any disclaimer, the term of this patent is extended or adjusted under 35 U.S.C. 154(b) by 351 days.

(21) Appl. No.: 18/011,016

(22) PCT Filed: Oct. 29, 2021

(86) PCT No.: PCT/EP2021/080206
§ 371 (c)(1),
(2) Date: Dec. 16, 2022

(87) PCT Pub. No.: WO2022/090512
PCT Pub. Date: May 5, 2022

(65) Prior Publication Data
US 2023/0219585 A1       Jul. 13, 2023

(30) Foreign Application Priority Data

Oct. 30, 2020    (GB) ...................................... 2017252
Oct. 30, 2020    (GB) ...................................... 2017253

(51) Int. Cl.
*B60W 50/00*          (2006.01)
*B60W 50/06*          (2006.01)
(Continued)

(52) U.S. Cl.
CPC ........ *B60W 50/06* (2013.01); *B60W 60/0013* (2020.02); *B60W 60/0015* (2020.02); *G05B 13/0265* (2013.01)

(58) Field of Classification Search
CPC ............. B60W 50/06; B60W 60/0013; B60W 60/0015; G05B 13/0265; G06F 11/3692; G08G 1/165; G05D 1/0214
See application file for complete search history.

(56) References Cited

U.S. PATENT DOCUMENTS 9,315,178 B1 *    4/2016    Ferguson ................ B60T 8/171
9,632,502 B1      4/2017    Levinson et al.
(Continued)

FOREIGN PATENT DOCUMENTS

CN          102449623 A        5/2012
CN          105573323 A        5/2016
(Continued)

OTHER PUBLICATIONS

International Search Report, PCT/EP2021/080206, Date: Feb. 28, 2022.
(Continued)

*Primary Examiner* — Peter D Nolan
*Assistant Examiner* — Peter Y Ning
(74) *Attorney, Agent, or Firm* — Andrew J. Tibbetts; Samuel S. Stone; Greenberg Traurig, LLP

(57) ABSTRACT
A computer-implemented method of evaluating the performance of a target planner for an ego robot comprises receiving evaluation data for evaluating the performance of the target planner in the scenario, generated by applying the target planner at incrementing planning steps, to compute a series of ego plans that respond to changes in the scenario and are implemented in the scenario to cause changes in an ego state. The evaluation data includes the ego plan computed by the target planner at one of the planning steps, and a scenario state at a time instant of the scenario. The evaluation data is used to evaluate the target planner by computing a reference plan for said time instant based on the
(Continued)

Runtime stack 100

Sensors 110 → Perception 102 → Prediction 104 → Planning 106 → Control 108 → Actor system 112 scenario state, the scenario state including the ego state at that time instant, and computing at least one evaluation score for comparing the ego plan with the reference plan.

20 Claims, 18 Drawing Sheets

(51) Int. Cl.
    *B60W 60/00*          (2020.01)
    *G05B 13/02*          (2006.01)

(56)                References Cited

U.S. PATENT DOCUMENTS

| | | | | |
|---|---|---|---|---|
| 10,678,247 | B2 * | 6/2020 | Jiang | G05D 1/0088 |
| 10,884,422 | B2 | 1/2021 | Zhang et al. | |
| 2009/0240366 | A1 | 9/2009 | Kaushal et al. | |
| 2017/0277193 | A1 * | 9/2017 | Frazzoli | G05D 1/0214 |
| 2018/0129203 | A1 * | 5/2018 | Tafti | G05D 1/0088 |
| 2018/0292830 | A1 | 10/2018 | Kazemi et al. | |
| 2019/0079523 | A1 | 3/2019 | Zhu et al. | |
| 2019/0220015 | A1 | 7/2019 | Phillips et al. | |
| 2019/0220016 | A1 | 7/2019 | Phillips et al. | |
| 2019/0286151 | A1 | 9/2019 | Palanisamy et al. | |
| 2019/0317511 | A1 | 10/2019 | Xu et al. | |
| 2020/0134729 | A1 | 4/2020 | Matsunaga et al. | |
| 2020/0310446 | A1 | 10/2020 | Zhu et al. | |
| 2020/0310451 | A1 | 10/2020 | Zhu et al. | |
| 2020/0326719 | A1 * | 10/2020 | Tram | B60W 30/18159 |
| 2021/0094569 | A1 * | 4/2021 | Febbo | G05D 1/024 |
| 2021/0114617 | A1 | 4/2021 | Phillips et al. | |
| 2021/0118245 | A1 * | 4/2021 | Gyllenhammar | G01S 17/87 |
| 2021/0221386 | A1 * | 7/2021 | Quirynen | B60W 60/001 |
| 2021/0237769 | A1 | 8/2021 | Ostafew | |
| 2021/0240190 | A1 | 8/2021 | Wray et al. | |
| 2021/0302974 | A1 | 9/2021 | Di Cairano et al. | |
| 2021/0394794 | A1 * | 12/2021 | Gyllenhammar | B60W 40/10 |
| 2021/0403034 | A1 | 12/2021 | Lapin et al. | |
| 2022/0055651 | A1 | 2/2022 | Baric et al. | |
| 2022/0121213 | A1 | 4/2022 | Hsu et al. | |
| 2022/0371594 | A1 * | 11/2022 | Raffone | B60W 30/09 |
| 2023/0089978 | A1 | 3/2023 | Pulver et al. | |
| 2023/0365131 | A1 | 11/2023 | Do et al. | |

FOREIGN PATENT DOCUMENTS

| | | |
|---|---|---|
| CN | 108292134 A | 7/2018 |
| CN | 108604239 A | 9/2018 |
| CN | 109910018 A | 6/2019 |
| CN | 110271556 A | 9/2019 |
| CN | 110462670 A | 11/2019 |
| WO | 2017/079474 A2 | 5/2017 |
| WO | 2017/116594 A1 | 7/2017 |
| WO | 2020/079066 A1 | 4/2020 |
| WO | 2020079074 A1 | 4/2020 |
| WO | WO-2020079698 A1 * | 4/2020 ........... G01S 13/865 |

OTHER PUBLICATIONS

International Search Report and Written Opinion from the International Searching Authority from related PCT Application No. PCT/EP2021/052040, dated Mar. 29, 2021, (12 pages).
Salvado et al., "Motion Planning and Goal Assignment for Robot Fleets Using Trajectory Optimization," 2018 IEEE/RSJ International Conference on Intelligent Robots and Systems (IROS), IEEE, Oct. 1-5, 2018, pp. 7939-7946.
Hult et al., "An MIQP-based heuristic for Optimal Coordination of Vehicles at Intersections," 2018 IEEE Conference on Decision and Control (CDC), IEEE, Dec. 17-19, 2018, pp. 2783-2790.
Most, Thomas, "Approximation of complex nonlinear functions by means of neural networks," 2nd Weimar Optimization and Stochastic Days, 2005, pp. 1-17.
Eiras et al., "A Two-Stage Optimization Approach to Safe-by-Design Planning for Autonomous Driving," arXiv.org, arXiv.2002.02215v1, Feb. 6, 2020, pp. 1-10.
International Search Report and Written Opinion from the International Searching Authority from related PCT Application No. PCT/EP2021/052036, dated Apr. 9, 2021, (13 pages).
Schwarting Wilkq et al: "Safe Nonlinear Trajectory Generation for Parallel Autonomy With a Dynamic Vehicle Model", IEEE Tran sa cti ons on Intelligent Transportation Systems, IEEE, Piscataway, NJ, USA, vol. 19, No. 9, Sep. 1, 2018 (Sep. 1, 2018), pp. 2994-3008.
Pokorny Florian T. et al: "Topological trajectory classification with filtrations of simplicial complexes and persistent homology", International Journal of Robotics Research., vol. 35, No. 1-3, Aug. 21, 2015 (Aug. 21, 2015), pp. 204-223.
U.S Office Action date Sep. 3, 2024, from related U.S. Appl. No. 17/796,209.
U.S Office Action date Oct. 25, 2024, from related U.S. Appl. No. 17/796,206.
U.S. Appl. No. 17/796,206, filed Jul. 28, 2022, Henry Pulver.
U.S. Appl. No. 17/796,209, filed Jul. 28, 2022, Majd Hawasly.
Extended European Search Report dated Nov. 6, 2024, from related European Patent Application 24194819.9 (6 pages).
Chinese Office Action dated Apr. 23, 2025, from related Chinese Patent Application 202180057120.3 (12 pages).

* cited by examiner

Shadow Mode

In-Loop Mode

TOOLS FOR PERFORMANCE TESTING AND/OR TRAINING AUTONOMOUS VEHICLE PLANNERS

CROSS-REFERENCE TO RELATED APPLICATIONS

This application is the U.S. National Stage application, pursuant to 35 U.S.C. § 371, of PCT International Patent Application No. PCT/EP2021/080206, filed Oct. 29, 2021, designating the United States and published in English, which claims priority under 35 U.S.C. §§ 119 and 365 to Great Britain Patent Application No. 2017252.4, filed Oct. 30, 2020, and Great Britain Patent Application No. 2017253.2, filed Oct. 30, 2020. The contents of each of the aforementioned applications are incorporated herein by reference in their entirety.

SUMMARY

The present disclosure relates to tools and techniques for testing the performance of autonomous vehicle planners, and methods, systems and computer programs for implementing the same. The present techniques can also be applied in a training context, in order to generate training data for training a planner.

BACKGROUND

There have been major and rapid developments in the field of autonomous vehicles. An autonomous vehicle is a vehicle which is equipped with sensors and autonomous systems which enable it to operate without a human controlling its behaviour. The term autonomous herein encompass semi-autonomous and fully autonomous behaviour. The sensors enable the vehicle to perceive its physical environment, and may include for example cameras, radar and lidar. Autonomous vehicles are equipped with suitably programmed computers which are capable of processing data received from the sensors and making safe and predictable decisions based on the context which has been perceived by the sensors. There are different facets to testing the behaviour of the sensors and autonomous systems aboard a particular autonomous vehicle, or a type of autonomous vehicle. AV testing can be carried out in the real world or based on simulated driving scenarios. An ego vehicle under testing (real or simulated) may be referred to as an ego vehicle.

One approach to testing in the industry relies on "shadow mode" operation. Such testing seeks to use human driving as a benchmark for assessing autonomous decisions. An autonomous driving system (ADS) runs in shadow mode on inputs captured from a sensor-equipped but human-driven vehicle. The ADS processes the sensor inputs of the human-driven vehicle, and makes driving decisions as if it were notionally in control of the vehicle. However, those autonomous decisions are not actually implemented, but are simply recorded with the aim of comparing them to the actual driving behaviour of the human. "Shadow miles" are accumulated in this manner typically with the aim of demonstrating that the ADS could have performed more safely or effectively than the human.

SUMMARY

Existing shadow mode testing has significant drawbacks. Shadow mode testing may flag some scenario where the available test data indicates that an ADS would have performed differently from the human driver. However, there are two fundamental deficiencies in this approach: firstly, shadow mode operation does not provide a reliable indicator of how the ADS would have actually performed in that scenario had it been in control of the vehicle; secondly, to the extent shadow mode operation can meaningfully demonstrate some discrepancy between human and autonomous behaviour, it provides little insight as to the reasons for those discrepancies.

Expanding on the first point, at a given planning step where the ADS is required to make some immediate driving decision, it will have access to some approximation of the ego vehicle's own state and various observations of the vehicle's surroundings derived from the vehicle's on-board sensors. All the ADS can do is use those data to decide some immediate action it would therefore take. However, if the human does something different then, in the next planning step, the ADS is not starting from the state it would have reached if its own decision had been implemented—it is starting from a (in all likelihood) different state caused by the human's behaviour. In other words, the ADS is not having to address any consequences of its decisions as the planning scenario progresses, because those autonomous decisions have no consequences in shadow mode. This contrast to an actual autonomous driving scenario with an ADS in control of a vehicle—in that case, the ADS will, at any given planning step, assess the situation based on the observations is currently has available, and decide some best course of action, leveraging some form of prediction logic to plan into the future. But, as the scenario develops and new observations become available, the best course of action may deviate significantly over the course of multiple planning steps—driven, not only by deviation from the earlier predictions (which can never be perfect), but also by the ADS's own driving systems as they are implemented. In summary, existing shadow mode systems can, at best, provide some insight into the instantaneous reasoning of the ADS at a particular planning step in the scenario, but no insight as to how it would actually perform over the duration of the scenario.

On the other hand, for the human driver, the opposite is true the only insights into the human driver behaviour are the actual, final trajectories the human driver decided to take over the course of some driving scenario; but no structured insights as to the reasons for those decisions, or to the long term planning in the mind of the expert human driver. It is not possible to say, for example, with any certainty whether particular events during the scenario caused the human driver to change their mind about some earlier plan; an experienced human driver to whom driving is "second nature" may even be unable to articulate such matters in qualitative terms.

Expanding on the second point above, the human driver and ADS are not operating on the same perspective of the world. The human driver observes the world from the driver's seat with their own senses, and whereas the ADS observes the world via the vehicle's sensors. At best, this might indicate that a particular AV sensor set up combined with a particular ADS is better than a human in similar circumstances. However, such techniques are unable to provide more targeted insights.

A first aspect herein provides a computer-implemented method of evaluating the performance of a target planner for an ego robot in a real or simulated scenario, the method comprising:

receiving evaluation data for evaluating the performance of the target planner in the scenario, the evaluation data generated by applying the target planner at incrementing planning steps, in order to compute a series of ego plans that respond to changes in the scenario, the series of ego plans being implemented in the scenario to cause changes in an ego state the evaluation data comprising: the ego plan computed by the target planner at one of the planning steps, and a scenario state at a time instant of the scenario, wherein the evaluation data is used to evaluate the target planner by:

computing a reference plan for said time instant based on the scenario state, the scenario state including the ego state at that time instant as caused by implementing one or more preceding ego plans of the series of ego plans computed by the target planner, and computing at least one evaluation score for comparing the ego plan with the reference plan.

One application of the method is to provide a systematic comparison between the target planner and the reference planner. The reference planner provides an objective benchmark for assessing the capability of the target planner. An important benefit is the ability to perform "like-for-like" comparison. Both planners produce comparable plans, and that reference planner provides a more meaningful benchmark than human behaviour. Another benefit is the ability to implement the method on simulated scenarios, which makes it far more scalable (although the possibility of alternatively or additionally implementing the target planner in the real world is not excluded).

In embodiments, the ego plans may take the form of instantaneous ego trajectories, and the instantaneous ego trajectory at said planning step may extend further in time than the next planning step, and may be only partially implemented in the scenario up to the next planning step before the instantaneous ego trajectory of the next planning step is computed (i.e. only an initial portion of the instantaneous ego trajectory, up to the next planning step, may be implemented).

In this context, in order to make decisions about what action to take up to the next planning step, the target planner reasons further into the future than the next planning step. The instantaneous ego trajectory is a form of "internal state" that provides insights into the reasoning of the target planner at a particular point in time, above and beyond the actual trajectory taken over the course of the scenario.

The reference plan may take the form of an instantaneous reference trajectory, the at least one evaluation score for comparing the instantaneous ego trajectory with the instantaneous reference trajectory.

Such embodiments address performance testing of an autonomous vehicle planner (the target planner) that reasons into the future in order to effectively plan trajectories for an ego robot (ego trajectories), e.g. in the presence of static and/or dynamic obstacle(s). That is, over a series of incrementing planning steps, the planner plans an "instantaneous" ego trajectory at each planning step that extends further into the future than the next planning step. This means that any given instantaneous ego trajectory is unlikely to be fully realized, because the scenario will, in all likelihood, have evolved in a way that does not completely match the planner's earlier expectations. In this sense, an instantaneous ego trajectory is a form of "internal state" of the planner. Over the course of a scenario, the instantaneous trajectories at different planning scenarios provide valuable insights into the reasons the behaviour of the ego robot (whether in the real world or in simulation).

Unlike existing shadow mode systems, the ego robot (real or simulated) is actually under the control of the target planner being tested. That is, planning decisions are actually realized as changes in the state of the ego robot (the ego state)—via an actuator system of a real-world robot, or in simulation (possibly using robot dynamics modelling for additional realism). For the reasons explained in the previous paragraph, any given instantaneous trajectory is unlikely to be fully realized in this manner—only an initial portion of the instantaneous trajectory will actually be realized as a change in the ego state before the next planning is reached and the target planner re-plans from the new ego state (taking into account any changes to the scenario, e.g. any new obstacle data that has become available in the interim).

The performance of the target planner is assessed not with respect to a human driver, but to a reference planner that plans instantaneous "reference" trajectories in a comparable way. The reference planner can be applied at any given planning step and, importantly, does so from the same ego state as the target planner, with the same level of information about the obstacles, and with the objective of fulfilling the same goal. This, in turn, facilitates a meaningful comparison between the instantaneous ego trajectory from the target planner and the instantaneous reference planner—comparing "like-for-like" in a way that provides much more rigorous, quantitative insights into not only the differences in the decisions taken by the two planners, but the reasons for those differences.

An actual trajectory of the ego robot (which could be real or simulated) taken over the duration of the scenario is determined, not by any individual one of the instantaneous ego trajectories, but via the repeated planning of the instantaneous ego trajectories at the incrementing planning steps. Because the target planner plans further into the future than the next planning step, in general, none of the instantaneous ego trajectories is every fully realized—changes to the scenario (in particular, changes to the available obstacle data) make it likely that the instantaneous ego trajectories will deviate from each other at different planning steps.

The planning step may occur at the time instant of the scenario (i.e. the scenario state may be the state of the scenario at the time of the aforementioned planning step), and the ego plan and the reference plan may both be computed based on the scenario state at that time instant.

In the case that the plans are instantaneous trajectories, the instantaneous ego trajectory and the instantaneous reference trajectory may both extend beyond the next planning step.

Alternatively, said time instant may be later than said planning step, such that the reference plan takes into account changes in the scenario since that planning step that are embodied in the scenario state.

The present techniques can also be applied in training, where the aim is for the planner to learn to imitate the reference planner via imitation learning. In that context, the techniques can be applied to generate superior training data that can be used, for example, in Dataset Aggregation (DAgger) training. In this context, the reference planner acts as a queryable expert that can be used to augment a training set with problems (scenario states) actually encountered by the target planner. In this imitation learning context, it is important that the scenario is being progressed according to the ego plans from the target planner.

In the presence of obstacles, in general the planners will reason about optimal or acceptable trajectories based on some level of predicted obstacle behaviour. In a more "modular" autonomous driving architecture, predicted obstacle trajectories may be provided by a separate prediction system.

In other architectures, planning and prediction may be more tightly integrated. At the extreme is an end-to-end driving model, in which an entire AV stack is implemented as an end-to-end trainable function approximator that receives raw sensor inputs and computes trajectories therefrom.

In general, the term planner accommodates any level of modularity or integration—in the context of the present aspect, a planner is any component or system that can plan instantaneous trajectories, i.e. trajectories that extend further into the future than the next planning step, in the expectation that such instantaneous trajectories will not be fully realized; or, to put it another way, any component or system that autonomously decides what action to take between the current planning step and the next planning step by reasoning further into the future than the next planning step.

In the case that the above planning step occurs at the above time instant, the scenario state at that time instant of said planning step may comprise or be derived from a current set of observations used by the target planner to compute the ego plan, and the reference planner may use the same set of observations to compute the reference plan.

That is to say, the scenario state may comprise a set of available obstacle data (observed and/or predicted).

The set of available obstacle data constitute shared inputs, common to both the target and reference planners. These are the inputs on which the decision making/reasoning processes of both planners are based, and they can take different forms depending on the context. For example, with a modular architecture that separates planning and prediction, it is generally preferable (but not essential) for both the target and reference planners to plan on the basis of a common set of predicted obstacle trajectories (which, in that case, form part of the set of available obstacle data shared between the planners)—by essentially freezing the prediction "dimension" between the planners (i.e. removing this as a degree of freedom), it becomes easier to attribute discrepancies between the target and reference trajectories to high-level decision making within the planners, as opposed to discrepancies in prediction. With a planner that integrates prediction, the shared inputs only may be "lower level" inputs such as perception outputs (real or simulated) or even raw sensor data (real or simulated) in the extreme, with each planner relying on its own form of predictive logic—the reference trajectories still provide a useful baseline in that case.

For example, the observations may be noisy observations subject to real or modelled observation errors, and in that case the target and reference planners are both subject to the same observation errors. Alternatively, the scenario may be simulated, and the observations may be simulated observations without any observation error, such that neither the target nor the reference planner is subject to observation error.

The scenario state may comprise the current set of observations and/or one or more current obstacle predictions derived from the current set of observations, and in that case the target and reference planners may compute the ego plan and reference plan respectively using the same observations and/or the same obstacle predictions.

As noted, the evaluation data can be captured by applying the target planner to real or simulated scenarios. Hence, the available obstacles data, to which the reference planner is also applied, may be real or simulated.

The ability to implement the method in simulation removes or reduces the need for actual driven test miles. One estimation is that, in order to match human drivers in terms of safety, an ADS should be capable of making and implementing decisions with an error rate no greater than 1 in $10^7$. Verifying performance at this level based on actual driven test miles alone would require many multiples of this. The ability to provide meaningful benchmarking through a testing regime that is at least partly implemented in simulation is a significant benefit.

The aforementioned planning step may occur at the aforementioned time instant of the scenario (i.e. the scenario state may be the state of the scenario at the time of the aforementioned planning step), and the ego plan and the reference plan may both be computed based on the scenario state at that time instant. In other words, the reference planner may be applied at the same time instant of the scenario as the target planner.

In the case that the plans are instantaneous trajectories, the instantaneous ego trajectory and the instantaneous reference trajectory may both extend beyond the next planning step.

Alternatively, said time instant may be later than said planning step, such that the reference plan takes into account changes in the scenario since that planning step that are embodied in the scenario state.

There are various circumstances in which the reference plan may be superior to the ego plan from the target planner. Such differences can be a useful way to assess the performance of the target planner in a meaningful way.

For example, the target planner may be constrained to operate in real-time, and the reference plan may not be computed in real-time.

Alternatively or additionally, more computing resources and/or memory resources may be allocated to compute the reference plan than are granted to the target planner for computing the ego plan.

As noted, the reference plan may be computed by applying a reference planner to the scenario state at said time instant. However, alternatively, said time instant may be later than said planning step, such that the reference plan takes into account changes in the scenario since that planning step that are embodied in the scenario state.

The reference plan is computed by applying a reference planner to the scenario state at said time instant.

For example, the reference planner may be a constrained optimization-based planner, as in the embodiments described below.

Alternatively, the reference plan may be computed using the target planner, but:

with a greater allocation of computing or memory resources than used to compute the ego plan without being constrained to operate in real-time, in the case that the ego plan is computed in real-time, with said time instant being later than said planning step, and/or without the modelled perception errors, in the case that the ego plan is influenced by modelled perception errors.

The evaluation data may comprise the instantaneous ego plans computed at multiple planning steps of the incrementing planning steps, and multiple scenario states, each associated with one of the multiple planning steps. A reference plan may be computed for each of the multiple planning steps based on the associated scenario state at that planning step, and at least one evaluation score may be computed for each of the multiple planning steps for comparing the ego and reference plans of that planning step.

For each of the multiple planning steps, the associated scenario state may be a scenario state at that planning step, or a scenario state a set amount of time after that planning step.

The at least one evaluation score may comprise an individual evaluation score computed for the target plan and an individual evaluation score computed for the reference plan, the individual evaluation scores computed with respect to a common metric.

That is, separate individual metrics may be computed for the ego and reference plans, but with respect to the same metric so they are comparable.

Further or alternatively, the at least one evaluation score may comprise a comparative score quantifying a difference between the target and reference plans with respect to a comparison metric.

The common or comparison metric may quantify safety, comfort or progress in relation to a defined goal.

The target and reference plans may be computed with a common objective of fulfilling a defined goal.

For example, the goal may be defined as a static or moving goal location to be reached.

The evaluation score may be a numerical evaluation score for quantifying differences between the ego and reference plans.

The scenario may be a real or simulated driving scenario, the ego state being an ego vehicle state in that event.

The evaluation score may be computed with respect to metric that quantifies different levels of compliance with a predetermined driving rule between the ego and reference plans.

Multiple evaluation metrics may be used to compute multiple evaluation scores, each evaluation metric encoding a different predetermined driving rule.

The method may comprise the step of outputting the evaluation score at a user interface.

The evaluation score may be outputted with a visual representation of the scenario, and a visual representation of the ego and reference plans.

The at least one evaluation score may be for comparing:
  progress of the ego and reference trajectories towards a defined goal,
  deviation of the ego and reference trajectories from a reference path,
  acceleration along the ego and reference trajectories,
  jerk, i.e. rate of change of acceleration, along the ego and reference trajectories.

Separate evaluation scores may be computed for the ego and reference trajectories individually for making said comparison.

The present techniques can also be applied in training, where the aim is for the planner to learn to imitate the reference planner via imitation learning. In that context, the techniques can be applied to generate superior training data that can be used, for example, in Dataset Aggregation (DAgger) training. In this context, the reference planner acts as a queryable expert that can be used to augment a training set with problems (scenario states) actually encountered by the target planner. In this imitation learning context, it is important that the scenario is being progressed according to the ego plans from the target planner.

The target planner may comprise one or more trainable modes, and the evaluation data may provide one or more training examples that are used to train the target planer to imitate the reference planner. The evaluation score may be a component of a cost function (or objective/error function) that measures deviation between ego plans computed by the target planner and reference plans computed by the reference planner, the training performed with the objective of minimizing those deviations.

The target planner may have been previously trained on earlier training examples, the training examples provided by the evaluation data being new training examples used to re-train the target planner.

A further aspect herein provides a computer-implemented method of training a target planner to imitate an expert planner for an ego robot, the method comprising:
  applying the target planner in a simulated scenario at incrementing planning steps, in order to compute a series of ego plans that respond to changes in the scenario, the series of ego plans being implemented in the scenario to cause changes in an ego state;
  computing an expert plan for at least one of the planning steps, by applying the expert planner to a scenario state at that planning step, and
  using the scenario state and the expert plan as a training example, to train one or more models of the target planner to imitate the expert planner, the training performed with the objective of minimizing deviation between the ego plan computed by the target planner when applied to that scenario state and the expert plan computed by the expert planner when applied to that scenario state, the scenario state including the ego state at said planning step as caused by implementing one or more preceding ego plans of the series of ego plans computed by the target planner.

In embodiments, the ego plans may take the form of instantaneous ego trajectories computed by the target planner, wherein the instantaneous ego trajectory computed at said at least one planning step extends further in time than the next planning step, wherein the expert plan may also takes the form of an instantaneous expert trajectory extending further in time than that next planning step.

The expert planner may be a constrained optimization-based planner.

All of the above description pertaining to the reference planner applies equally to the expert planner in the context of the training aspect.

In the above aspects and embodiments, the reference planner could be said to be implemented in a form of shadow mode, in that it is not making decision in the scenario—the scenario state to which it is applied has instead been determined (in part) though the decision of the target planner.

Further aspects herein allow a similarly structured comparison but with the reference planner implemented "in-the-loop", making its own decisions in a second instance of the simulated scenario.

A further aspect herein provides a computer-implemented method of evaluating the performance of a target planner for an ego robot in a simulated scenario, the method comprising:
  receiving evaluation data for evaluating the performance of the target planner, the evaluation data generated by applying the target planner in a first instance of the scenario from an initial scenario state at first incrementing planning steps, in order to compute a series of ego plans that respond to changes in the first instance of the scenario, the first series of ego plans being implemented in the first instance of the scenario to cause changes in a first ego state, wherein an actual ego trajectory is defined by the changes in the first ego state over a duration of the first instance of the scenario,
  the evaluation data comprising the initial scenario state and the actual ego trajectory;

wherein the evaluation data is used to evaluate the target planner by:

applying a target planner in a second instance of the scenario from the same initial scenario state at second incrementing planning steps, in order to compute a series of reference plans that respond to changes in the second instance of the scenario, the series of reference plans being implemented in the second instance of the scenario to cause changes in a second ego state, wherein an actual reference trajectory is defined by the changes in the second ego state over a duration of the second instance of the scenario, and computing at least one evaluation score for comparing the actual ego trajectory with the actual reference trajectory.

The ego plans may take the form of instantaneous ego trajectories, wherein the instantaneous ego trajectory of at least one planning step of the first series of planning steps may extend further in time than the next planning step, and may be only partially implemented in the first instance of the scenario up to the next planning step before the instantaneous ego trajectory of the next planning step is planned, the actual ego trajectory defined not by any individual one of the instantaneous ego trajectories but by the changes in the first ego state over the duration of the scenario. The reference plans may take the form of instantaneous reference trajectories, wherein the instantaneous reference trajectory of at least one planning step of the second series of planning steps may extend further in time than the next planning step, and may be only partially implemented up to the next planning step before the instantaneous reference trajectory of the next planning step is computed, the actual reference trajectory defined not by any individual one of the instantaneous reference trajectories but by the changes in the second ego state over the duration of the scenario.

The method may comprise the step of receiving an indication of the starting state at a user interface, and instigating at least the second instance of the scenario in response thereto.

The actual trajectories can be scored/compares in exactly the same way as the plans/instantaneous trajectories in the earlier described aspects/embodiments. All of the above description applies A further aspect herein provides a computer-implemented method of evaluating the performance of a target planner for an ego robot in a real or simulated scenario having one or more obstacles, the method comprising:

receiving evaluation data for evaluating the performance of the target planner in the scenario, the evaluation data generated by applying the target planner at incrementing planning steps of the scenario, wherein at each planning step, the target planner plans an instantaneous ego trajectory, based on a current ego state and a current set of available obstacle data, with the objective of fulfilling a defined goal, wherein the set of available obstacle data is updated between successive planning steps, and the instantaneous ego trajectory planned at the earlier of those planning steps extends further in time than the later of those planning steps, such that only an initial portion of the earlier instantaneous ego trajectory is substantially realized as a change in the ego state, before the later instantaneous ego trajectory is planned based on the changed ego state and the updated set of available obstacle data, the evaluation data comprising the instantaneous ego trajectory of at least one of the planning steps, and the ego state and the set of available obstacle data of that planning step, on which that instantaneous ego trajectory is based, the method further comprising:

applying a reference planner, so as to plan a corresponding instantaneous reference trajectory for that planning step, based on the same ego state and the same set of available obstacle data, with the objective of fulfilling the same goal; and computing at least one trajectory evaluation score for comparing the instantaneous ego trajectory with the corresponding instantaneous reference trajectory.

BRIEF DESCRIPTION OF FIGURES

Example embodiments of the present invention will now be described, by way of example only, with reference to the following figures in which.

DETAILED DESCRIPTION

Example AV Stack

Figure 1:
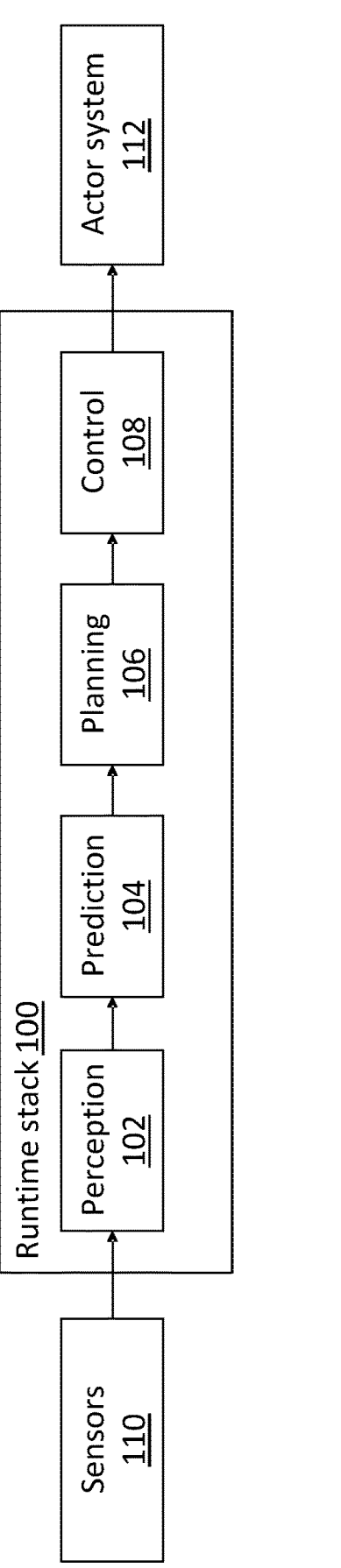
FIG. 1 shows an example autonomous vehicle AV) runtime stack.

FIG. 1 shows a highly schematic block diagram of a runtime stack 100 for an autonomous vehicle (AV), also referred to herein as an ego vehicle (EV). The run time stack 100 is shown to comprise a perception system 102, a prediction system 104, a planner 106 and a controller 108.

In a real-world context, the perception system 102 would receive sensor inputs from an on-board sensor system 110 of the AV and uses those sensor inputs to detect external agents and measure their physical state, such as their position, velocity, acceleration etc. The on-board sensor system 110 can take different forms but generally comprises a variety of sensors such as image capture devices (cameras/optical sensors), lidar and/or radar unit(s), satellite-positioning sensor(s) (GPS etc.), motion sensor(s) (accelerometers, gyroscopes etc.) etc., which collectively provide rich sensor data from which it is possible to extract detailed information about the surrounding environment and the state of the AV and any external actors (vehicles, pedestrians, cyclists etc.) within that environment. The sensor inputs typically comprise sensor data of multiple sensor modalities such as stereo images from one or more stereo optical sensors, lidar, radar etc.

The perception system 102 comprises multiple perception components which co-operate to interpret the sensor inputs and thereby provide perception outputs to the prediction system 104. External agents may be detected and represented probabilistically in a way that reflects the level of uncertainty in their perception within the perception system 102.

The perception outputs from the perception system 102 are used by the prediction system 104 to predict future behaviour of external actors (agents), such as other vehicles in the vicinity of the AV. Other agents are dynamic obstacles from the perceptive of the EV. The outputs of the prediction system 104 may, for example, take the form of a set of predicted of predicted obstacle trajectories.

Predictions computed by the prediction system 104 are provided to the planner 106, which uses the predictions to make autonomous driving decisions to be executed by the AV in a given driving scenario. A scenario is represented as a set of scenario description parameters used by the planner 106. A typical scenario would define a drivable area and would also capture any static obstacles as well as predicted movements of any external agents within the drivable area.

A core function of the planner 106 is the planning of trajectories for the AV (ego trajectories) taking into account any static and/or dynamic obstacles, including any predicted motion of the latter. This may be referred to as trajectory planning. A trajectory is planned in order to carry out a desired goal within a scenario. The goal could for example be to enter a roundabout and leave it at a desired exit; to overtake a vehicle in front; or to stay in a current lane at a target speed (lane following). The goal may, for example, be determined by an autonomous route planner (not shown). In the following examples, a goal is defined by a fixed or moving goal location and the planner 106 plans a trajectory from a current state of the EV (ego state) to the goal location. For example, this could be a fixed goal location associated with a particular junction or roundabout exit, or a moving goal location that remains ahead of a forward vehicle in an overtaking context. A trajectory herein has both spatial and motion components, defining not only a spatial path planned for the ego vehicle, but a planned motion profile along that path.

The planner 106 is required to navigate safely in the presence of any static or dynamic obstacles, such as other vehicles, bicycles, pedestrians, animals etc.

Figure 1A:
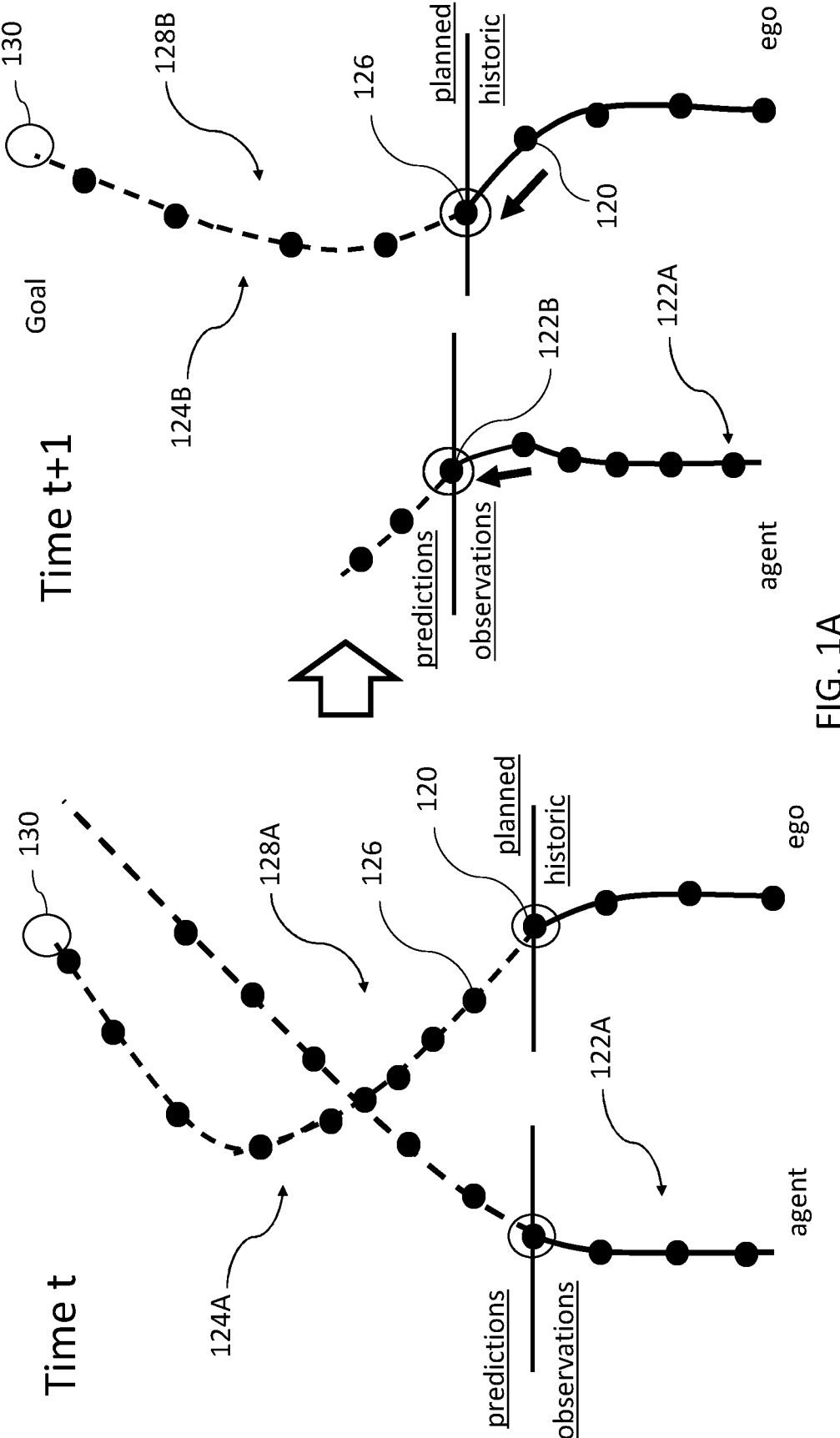
FIG. 1A shows examples of planned trajectories having spatial and motion components.

FIG. 1A schematically illustrates the operation of the planner 106 in an example scenario. It will be appreciated that FIG. 1A is highly schematic, with certain aspects exacerbated for the sake of illustration, meaning that the situation depicted does not necessarily correspond to a realistic driving scenario.

The planner 106 would typically be applied in a sequence of planning steps over the course of a scenario. At each planning step, a certain level of information about the vehicle's surroundings is available to the planner 106 from the perception and prediction systems 102, 104. This includes, in particular, information about the predicted behaviour of any obstacles in the vicinity of the vehicle. At each planning step, the planner 106 plans an "instantaneous" trajectory for the ego vehicle (ego trajectory) from the current ego state with the objective of fulfilling some defined goal, e.g. reaching the (current) goal location. This trajectory is instantaneous in the sense that it is a trajectory for the ego vehicle that the planner considers substantially optimal (or, at the very least, viable) at a given planning step, given the level of information that is available to it from perception and prediction at that instant in time. A typical planner 106 will, however, plan further ahead in time than the next planning step, as reasoning further into the future will generally improve the quality of the planner's decision. The information available at that planning step is a "snapshot" that takes into account observations up to that point and the prediction system's "best guess" as to how the scenario will develop in light of those observations. Hence, in all likelihood, only an initial portion of the instantaneous ego trajectory will actually be realized at any given planning step, not least because the predictions it is based on will never be perfect in practice. Once an instantaneous ego trajectory has been planned, the ego vehicle will generally follow that trajectory up to the next planning step, at which point the process will be repeated to re-plan the ego trajectory from the new ego state, taking into account any relevant changes in the output of the perception and prediction systems 104, 106. By then, it might be that observations since the last planning step have materially altered the predictions from the prediction system 106, potentially causing a material change in the output of the planner 106.

FIG. 1A shows two sequential planning steps of an example scenario, having time indexes t and t+1 respectively. At time t, the ego vehicle is shown to be in a current ego state 120. An external agent has been perceived as a time sequence of perceived agent states 122A, up to time t. Those observations 122A are used by the prediction system 106 to predict a future trajectory 124A for the agent from time t, which in turn is used by the planner 106 to plan an ego trajectory 128A from the current ego state 120 to some defined goal location 130. Trajectories in FIG. 1A are represented as a sequence of states (black circles) at uniform time intervals, such that a relatively closer spacing of states represents relatively lower velocities along the trajectory in question. According to the agent's predicted trajectory 124A at time t+1, the agent will hinder the ego vehicle's progress towards the goal location 130. To ensure safe operation of the ego vehicle, the planner responds by reducing the ego vehicle's speed along the planned trajectory 128A to allow the agent to pass. However, those events are predicted to occur some time after the next planning step at t+1.

By the next planning step at time t+1, a new observed state 122B of the agent has become available, and this deviates significantly from the prediction at the preceding planning step. This, in turn, has resulted in a very different predicted trajectory 124B for the agent, such that the agent is no longer predicted to hinder the ego vehicle's progress toward the goal location 130 (fixed in this example). Since the last planning step at time t, the ego vehicle has itself travelled an initial portion of the most-recently planned ego trajectory 128A (from time t to time t+1) and has thus now reached, at least approximately, a new state 126 part way along the trajectory 128A planned at time t. Now at time t+1, and presented with the very different predicted agent trajectory 124B, the planner 106 plans a new trajectory 128B at time t+1, from the new ego state 126 at time t+1, that progresses more quickly towards the goal location 130.

The planned trajectories 128A, 128B are instantaneous trajectories in the above sense, representing the planner's current best plan given the level of information that is available to it at time instants t and t+1 respectively.

Returning to FIG. 1, within the stack 100, the controller 108 implements decisions taken by the planner 106. The controller 108 does so by providing suitable control signals to an on-board actor system 112 of the AV. At any given planning step, having planned an instantaneous ego trajectory, the planner 106 will provide sufficient data of the planned trajectory to the controller 108 to allow it to implement the initial portion of that planned trajectory up to the next planning step. For example, it may be that the planner 106 plans an instantaneous ego trajectory as a sequence of discrete ego states at incrementing future time instants, but that only the first of the planned ego states (or the first few planned ego states) are actually provided to the controller 108 for implementing.

In a physical AV, the actor system 112 comprises motors, actuators or the like that can be controlled to effect movement of the vehicle and other physical changes in the real-world ego state.

Control signals from the controller 108 are typically low level instructions to the actor system 112 that may be updated frequently. For example, the control signals could specify changes in velocity, acceleration, jerk etc. and/or changes in steering angle.

Simulation Testing—Overview

Embodiments herein have useful applications in simulation-based testing. Referring to the stack 100 by way of example, in order to test the performance of all or part of the stack 100 though simulation, the stack is exposed to simulated driving scenarios. The examples below consider testing of the planner 106—in isolation, but also in combination with one or more other sub-systems or components of the stack 100.

In a simulated driving scenario, an ego agent implements decisions taken by the planner 106, based on simulated inputs that are derived from the simulated scenario as it progresses. Typically, the ego agent is required navigate within a static drivable area (e.g. a particular static road layout) in the presence of one or more simulated obstacles of the kind a real vehicle needs to interact with safely. Dynamic obstacles, such as other vehicles, pedestrians, cyclists, animals etc. may be represented in the simulation as dynamic agents.

The simulated inputs are processed in exactly the same way as corresponding physical inputs would be, ultimately forming the basis of the planner's autonomous decision making over the course of the simulated scenario. The ego agent is, in turn, caused to carry out those decisions, thereby simulating the behaviours of a physical autonomous vehicle in those circumstances. In simulation, those decisions are ultimately realized as changes in a simulated ego state. There is this a two-way interaction between the planner 106 and the simulator, where decisions taken by the planner 106 influence the simulation, and changes in the simulation affect subsequent planning decisions. The results can be logged and analysed in relation to safety and/or other performance criteria.

A "slice" herein means a stack or subset of the components of a stack (sub-stack) under testing. The manner in which the stack is "sliced" for testing dictates the form of simulated perception inputs that need to be provided to the slice (stack/sub-stack).

Referring to the stack 100 by way of example, if the full stack (including the entire perception system 102) were to be tested, the simulated inputs would take the form of simulated sensor inputs, provided to the lowest-level components of the perception system 120. The perception system 102 would then interpret the simulated sensor input just as it would real sensor data, in order to provide perception outputs (which are simulated in the sense of being derived though interpretation of simulated sensor data). This may be referred to as "full" simulation, and would typically involve the generation of sufficiently realistic simulated sensor inputs (such as photorealistic image data and/or equally realistic simulated lidar/radar data etc.) that, in turn, can be fed to the perception system 102 and processed in exactly the same way as real sensor data. The resulting outputs of the perception system would, in turn, feed the higher-level prediction and planning system, testing the response of those components to the simulated sensor inputs.

Alternatively, in what may be referred to herein as "headless" simulation, simulated perception outputs are computed directly from the simulation, bypassing some or all of the perception system 102. In a real-world context, equivalent perception outputs would be derived by one or more perception components of the perception system 102 interpreting lower-level sensor inputs from the sensors. In headless simulation, those perception components are not applied—instead, the perception outputs of those perception components are computed directly from ground truth of the simulation, without having to simulate inputs to those perception components. For examples, for a bounding box detector, instead of generating simulated sensor data and applying the bounding box detector to the simulated sensor data, simulated bounding box detection outputs would instead be computed directly form the simulation.

As a general rule, the "lower down" the stack is sliced, the more complex the required simulated perception inputs (ranging from full sensor modelling at one extreme to simple simulated fused location/orientation measurements etc. at the other, which can be derived straightforwardly using efficient techniques like ray tracing).

Between those two extremes, there is scope for many different levels of input slicing, e.g. testing only a subset of the perception system, such as "later" perception components, i.e., components such as filters or fusion components which operate on the outputs from lower-level perception components (such as object detectors, bounding box detectors, motion detectors etc.).

Turning to the outputs of the stack 100, there are various ways in which decisions of the planner 106 can be implemented in testing. In "planning-level" simulation, the ego agent may be assumed to exactly follow the portion of the most recent planned trajectory from the current planning step to the next planning step. This is a simpler form of simulation that does not require any implementation of the controller 108 during the simulation. More sophisticated simulation recognizes that, in reality, any number of physical conditions might cause a real ego vehicle to deviate somewhat from planned trajectories (e.g. because of wheel slippage, delayed or imperfect response by the actor system, or inaccuracies in the measurement of the vehicle's own state 112 etc.). Such factors can be accommodated through suitable modelling of the ego vehicle dynamics. In that case, the controller 108 is applied in simulation, just as it would be in real-life, and the control signals are translated to changes in the ego state using a suitable ego dynamics model (in place of the actor system 112) in order to more realistically simulate the response of an ego vehicle to the control signals. In that case, as in real life, the portion of a planned trajectory from the current planning step to the next planning step may be only approximately realized as a change in ego state.

Example Testing Pipeline

Figure 2:
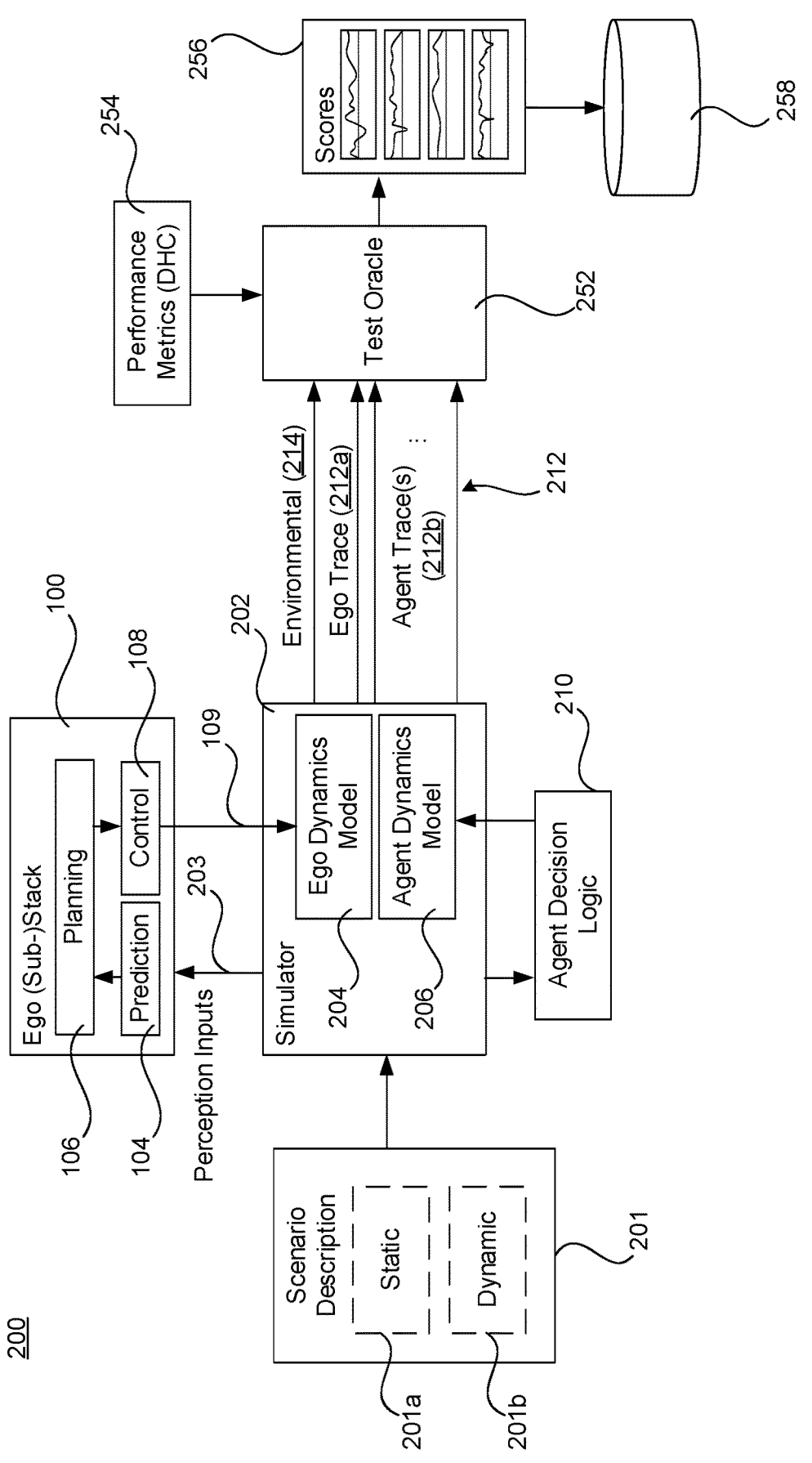
FIG. 2 shows a schematic block diagram of computer system for running simulated scenarios and evaluating trajectories planned in the simulated scenarios.

FIG. 2 shows a schematic block diagram of a testing pipeline 200. The testing pipeline is highly flexible and can accommodate many forms of AV stack, operating at any level of autonomy. As indicated, the term autonomous herein encompasses any level of full or partial autonomy, from Level 1 (driver assistance) to Level 5 (complete autonomy).

The testing pipeline 200 is shown to comprise a simulator 202 and a test oracle 252. The simulator 202 runs simulations for the purpose of testing all or part of an AV run time stack.

By way of example only, the description of the testing pipeline 200 makes reference to the runtime stack 100 of FIG. 1 to illustrate some of the underlying principles by example. As discussed, it may be that only a sub-stack of the run-time stack is tested, but for simplicity, the following description refers to the AV stack 100 throughout; noting that what is actually tested might be only a subset of the AV stack 100 of FIG. 1, depending on how it is sliced for testing. In FIG. 2, reference numeral 100 can therefore denote a full AV stack or only sub-stack depending on the context.

FIG. 2 shows the prediction, planning and control systems 104, 106 and 108 within the AV stack 100 being tested, with simulated perception inputs 203 fed from the simulator 202 to the stack 100. However, this does not necessarily imply that the prediction system 104 operates on those simulated perception inputs 203 directly (though that is one viable slicing, in which case the simulated perception inputs 203 would correspond in form to the final outputs of the perception system 102). For instance, in the example depicted in FIG. 2A and described in detail below, the AV stack 100 is sliced such that a subset of late perception components 102B (only) are included in a tested sub-stack 100S, together with the prediction, planning and control components 104, 106 and 108 (in this case, the simulated perception inputs 203 would correspond to the outputs of the remaining, earlier perception components that are not implemented with the stack 100 during testing). Where the full perception system 102 is implemented in the stack being tested (or, at least, where one or more lower-level perception components that operate on raw sensor data are included), then the simulated perception inputs 203 would comprise simulated sensor data.

The simulated perception inputs 203 are used as a basis for prediction and, ultimately, decision-making by the planner 108. The controller 108, in turn, implements the planner's decisions by outputting control signals 109. In a real-world context, these control signals would drive the physical actor system 112 of AV. The format and content of the control signals generated in testing are the same as they would be in a real-world context. However, within the testing pipeline 200, these control signals 109 instead drive the ego dynamics model 204 to simulate motion of the ego agent within the simulator 202.

To the extent that external agents exhibit autonomous behaviour/decision making within the simulator 202, some form of agent decision logic 210 is implemented to carry out those decisions and drive external agent dynamics within the simulator 202 accordingly. The agent decision logic 210 may be comparable in complexity to the ego stack 100 itself or it may have a more limited decision-making capability. The aim is to provide sufficiently realistic external agent behaviour within the simulator 202 to be able to usefully test the decision-making capabilities of the ego stack 100. In some contexts, this does not require any agent decision making logic 210 at all (open-loop simulation), and in other contexts useful testing can be provided using relatively limited agent logic 210 such as basic adaptive cruise control (ACC). Similar to the ego stack 100, any agent decision logic 210 is driven by outputs from the simulator 202, which in turn are used to derive inputs to the agent dynamics models 206 as a basis for the agent behaviour simulations.

A simulation of a driving scenario is run in accordance with a scenario description 201, having both static and dynamic layers 201a, 201b.

The static layer 201a defines static elements of a scenario, which would typically include a static road layout.

The dynamic layer 201b defines dynamic information about external agents within the scenario, such as other vehicles, pedestrians, bicycles etc. The extent of the dynamic information provided can vary. For example, the dynamic layer 201b may comprise, for each external agent, a spatial path to be followed by the agent together with one or both motion data and behaviour data associated with the path.

In simple open-loop simulation, an external actor simply follows the spatial path and motion data defined in the dynamic layer that is non-reactive i.e. does not react to the ego agent within the simulation. Such open-loop simulation can be implemented without any agent decision logic 210.

However, in "closed-loop" simulation, the dynamic layer 201b instead defines at least one behaviour to be followed along a static path (such as an ACC behaviour). In this, case the agent decision logic 210 implements that behaviour within the simulation in a reactive manner, i.e. reactive to the ego agent and/or other external agent(s). Motion data may still be associated with the static path but in this case is less prescriptive and may for example serve as a target along the path. For example, with an ACC behaviour, target speeds may be set along the path which the agent will seek to match, but the agent decision logic 110 might be permitted to reduce the speed of the external agent below the target at any point along the path in order to maintain a target headway from a forward vehicle.

The output of the simulator 202 for a given simulation includes an ego trace 212a of the ego agent and one or more agent traces 212b of the one or more external agents (traces 212).

A trace is a complete history of an agent's behaviour within a simulation having both spatial and motion components. For example, a trace may take the form of a spatial path having motion data associated with points along the path such as speed, acceleration, jerk (rate of change of acceleration), snap (rate of change of jerk) etc.

Additional information is also provided to supplement and provide context to the traces 212. Such additional information is referred to as "environmental" data 214 which can have both static components (such as road layout) and dynamic components (such as weather conditions to the extent they vary over the course of the simulation).

To an extent, the environmental data 214 may be "pass-through" in that it is directly defined by the scenario description 201 and is unaffected by the outcome of the simulation. For example, the environmental data 214 may include a static road layout that comes from the scenario description 201 directly. However, typically the environmental data 214 would include at least some elements derived within the simulator 202. This could, for example, include simulated weather data, where the simulator 202 is free to change weather conditions as the simulation progresses. In that case, the weather data may be time-dependent, and that time dependency will be reflected in the environmental data 214.

The test oracle 252 receives the traces 212 and the environmental data 214, and scores those outputs against a set of predefined numerical performance metrics to 254. The performance metrics 254 encode what may be referred to herein as a "Digital Highway Code" (DHC) or digital driving rules. Some examples of suitable performance metrics are given below.

The scoring is time-based: for each performance metric, the test oracle 252 tracks how the value of that metric (the score) changes over time as the simulation progresses. The test oracle 252 provides an output 256 comprising a score-time plot for each performance metric.

The metrics 254 are informative to an expert and the scores can be used to identify and mitigate performance issues within the tested stack 100.

Perception Error Models

Figure 2A:
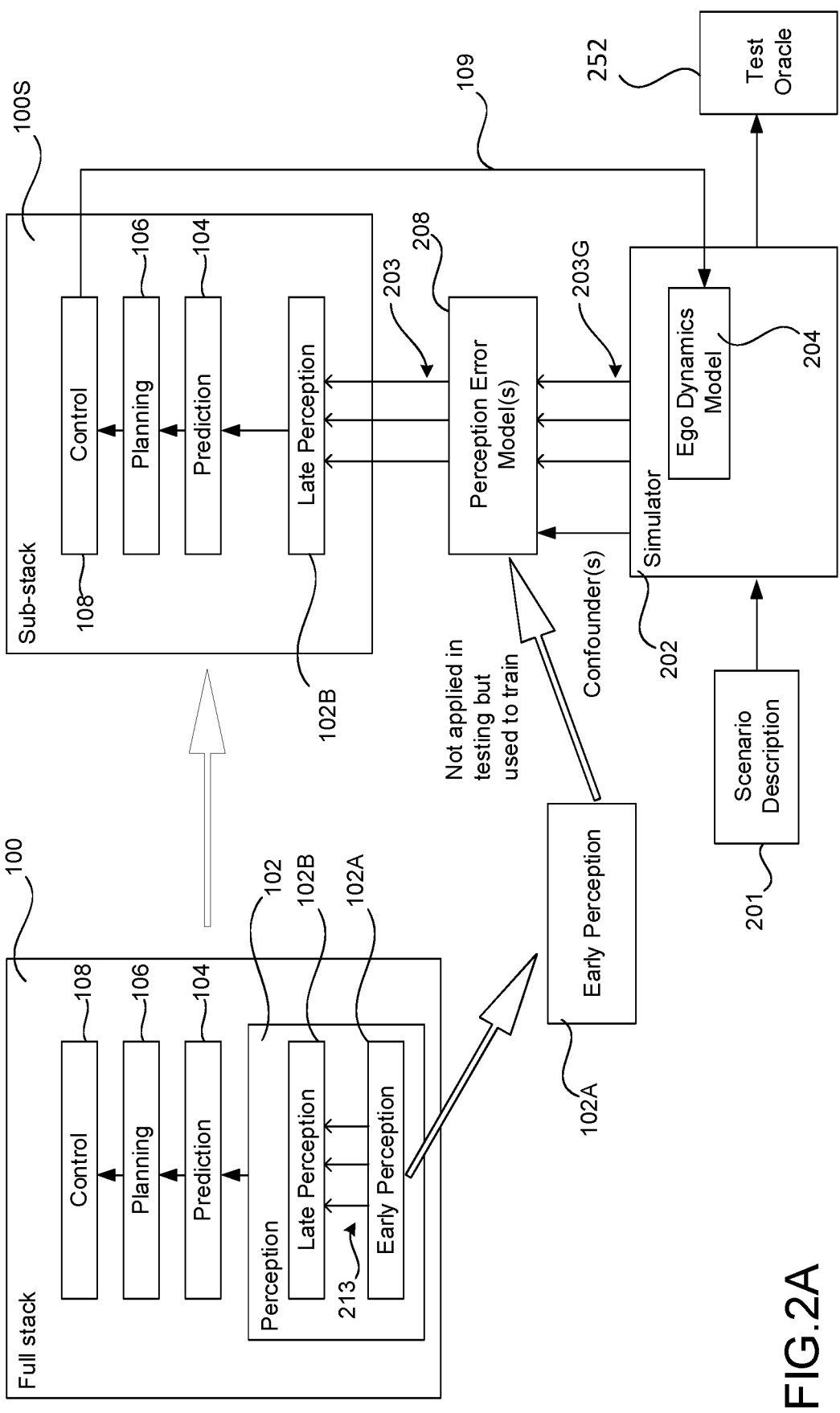
FIG. 2A shows an implementation of a simulator using perception error models.

FIG. 2A illustrates a particular form of slicing and uses reference numerals 100 and 100S to denote a full stack and sub-stack respectively. It is the sub-stack 100S that would be subject to testing within the testing pipeline 200 of FIG. 2.

A number of "later" perception components 102B form part of the sub-stack 100S to be tested and are applied, during testing, to the simulated perception inputs 203. The late perception components 102B could, for example, include filtering or other fusion components that fuse perception inputs from multiple earlier perception components.

In the full stack 100, the late perception component 102B would receive actual perception inputs 213 from earlier perception components 102A. For example, the earlier perception components 102A might comprise one or more 2D or 3D bounding box detectors, in which case the simulated perception inputs provided to the late perception components could include simulated 2D or 3D bounding box detections, derived in the simulation via ray tracing. The earlier perception components 102A would generally include component(s) that operate directly on sensor data.

With this slicing, the simulated perception inputs 203 would correspond in form to the actual perception inputs 213 that would normally be provided by the earlier perception components 102A. However, the earlier perception components 102A are not applied as part of the testing, but are instead used to train one or more perception error models 208 that can be used to introduce realistic error, in a statistically rigorous manner, into the simulated perception inputs 203 that are fed to the later perception components 102B of the sub-stack 100 under testing.

Such perception error models may be referred to as Perception Statistical Performance Models (PSPMs) or, synonymously, "PRISMs". Further details of the principles of PSPMs, and suitable techniques for building and training them, may be found in European Patent Application No. 20168311.7, incorporated herein by reference in its entirety. The idea behind PSPMs is to efficiently introduce realistic errors into the simulated perception inputs provided to the sub-stack 102B (i.e. that reflect the kind of errors that would be expected were the earlier perception components 102A to be applied in the real-world). In a simulation context, "perfect" ground truth perception inputs 203G are provided by the simulator, but these are used to derive more realistic perception inputs 203 with realistic error introduced by the perception error models(s) 208.

As described in the aforementioned reference, a PSPM can be dependent on one or more variables representing physical condition(s) ("confounders"), allowing different levels of error to be introduced that reflect different possible real-world conditions. Hence, the simulator 202 can simulate different physical conditions (e.g. different weather conditions) by simply changing the value of a weather confounder(s), which will, in turn, change how perception error is introduced.

The late perception components 102b within the sub-stack 100S process the simulated perception inputs 203 in exactly the same way as they would process the real-world perception inputs 213 within the full stack 100, and their outputs, in turn, drive prediction, planning and control.

Figure 3:
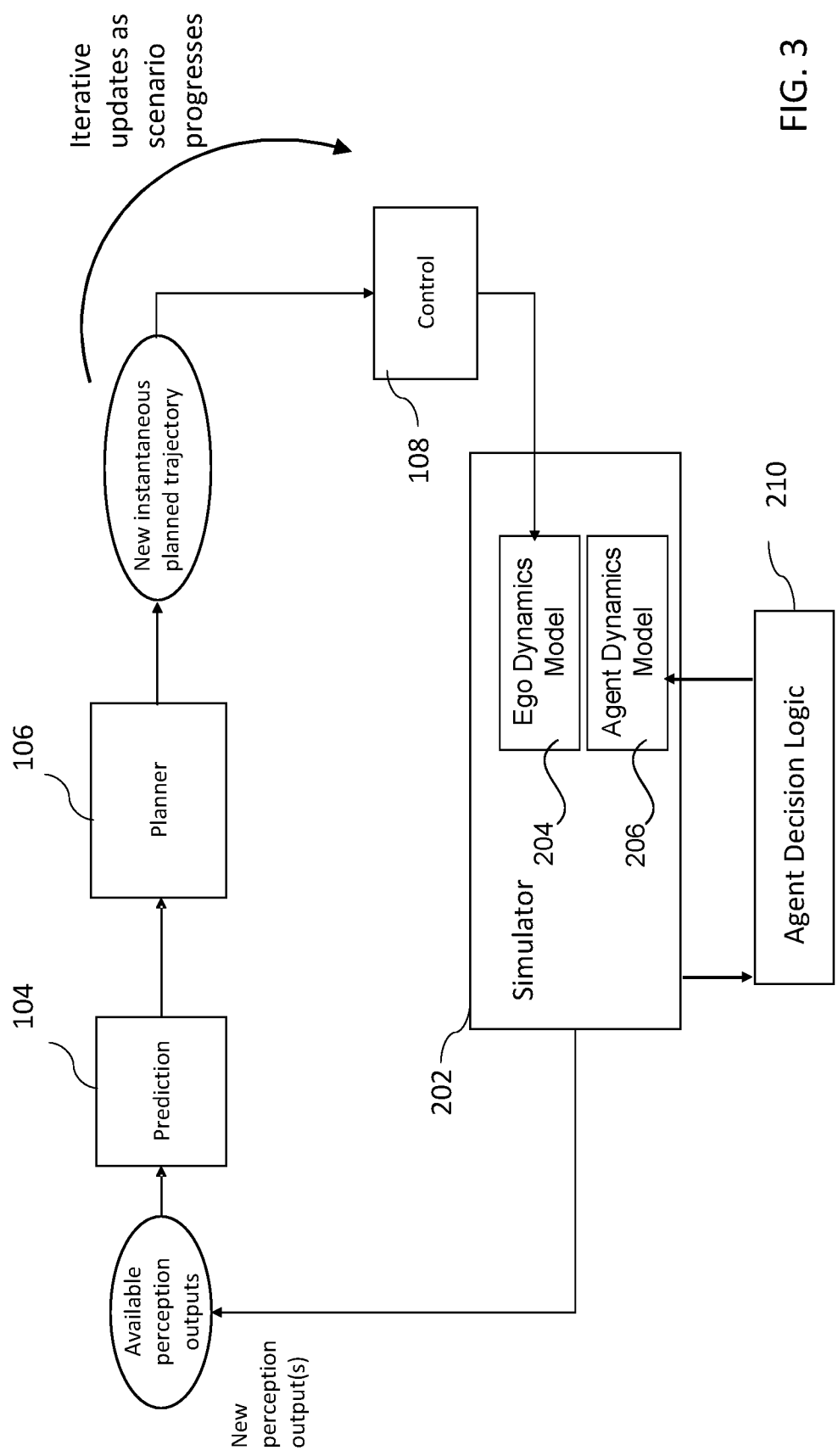
FIG. 3 shows a schematic block diagram of a target planner operating in-the loop.

FIG. 3 shows a block diagram illustrating how the planner 106 can be iteratively applied during testing, according the general principles illustrated in FIG. 1A. In the present example, simulated perception outputs and ego dynamics modelling are used. However, as noted, the present techniques can be applied with simpler forms of simulation.

At a given planning step, simulated perception outputs are derived from the simulator (directly, using perception error modelling as in FIG. 2A, or through the application of the perception system 102 to simulated sensor data). These perception outputs encode a perceived current state of the ego vehicle and a current state of any other agents of the scenario. The prediction system 104 uses the available perception outputs to produce a prediction for the behaviour of external agents of the scenario, in the form of one or more predicted agent trajectories. The prediction may utilize earlier perception outputs in addition. The planner 106 uses the output of both the perception system 102 to determine a new instantaneous trajectory for the ego vehicle in its current state, taking into account the state and predictions for other agents of the scenario. A control system 108 determines control signals to be passed to the simulator 202. The simulator 202 comprises an ego dynamics model 204, which simulates the motion of the ego vehicle based on the received control signal, as described above. The output of the simulator is used by agent decision logic 210 to derive inputs to the agent dynamics model 206 which determines the motion of agents. This, in turn, allows new perception outputs to be simulated for the next planning step, and the steps are performed iteratively, with a new instantaneous trajectory planned for each update to the motion of the ego vehicle and agents of the scenario. This continues until some terminating condition is reached, such as the ego agent reaching a defined goal location, a collision occurring, or a time limit being reached etc.

Testing Metrics

The performance metrics 254 can be based on various factors, such as distance, speed etc. In the described system, these can mirror a set of applicable road rules, such as the Highway Code applicable to road users in the United Kingdom. The terms "Digital Highway Code" (DHC) and "digital driving rules" may be used synonymously in relation to the set of performance metrics 254. The DHC terminology is a convenient shorthand and does not imply any particular driving jurisdiction. The DHC can be made up of any set of performance metrics 254 that can assess driving performance numerically. As noted, each metric is numerical and time-dependent. The value of a given metric at a partial time is referred to as a score against that metric at that time.

Relatively simple metrics include those based on vehicle speed or acceleration, jerk etc., distance to another agent (e.g. distance to closest cyclist, distance to closest oncoming vehicle, distance to curb, distance to center line etc.). A comfort metric could score the path in terms of acceleration or a first or higher order time derivative of acceleration (jerk, snap etc.). Another form of metric measures progress to a defined goal, such as reaching a particular roundabout exit. A simple progress metric could simply consider time taken to reach a goal. More sophisticated metrics quantify concepts such as "missed opportunities", e.g. in a roundabout context, the extent to which an ego vehicle is missing opportunities to join a roundabout.

For each metric, as associated "failure threshold" is defined. An ego agent is said to have failed that metric if its score against that metric drops below that threshold.

Not all of the metrics 252 will necessarily apply to a given scenario. For example, a subset of the metrics 254 may be selected that are applicable to a given scenario. An applicable subset of metrics can be selected by the test oracle 252 in dependence on one or both of the environmental data 214 pertaining to the scenario being considered, and the scenario description 201 used to simulate the scenario. For example, certain metric may only be applicable to roundabouts or junctions etc., or to certain weather or lighting conditions.

One or both of the metrics 254 and their associated failure thresholds may be adapted to a given scenario. For example, speed-based metrics and/or their associated failure metrics may be adapted in dependence on an applicable speed limit but also weather/lighting conditions etc.

The planner continuously updates the planned trajectories based on the latest perception and prediction outputs from the perception system 102 and prediction system 104.

Planner Benchmarking

Figure 3A:
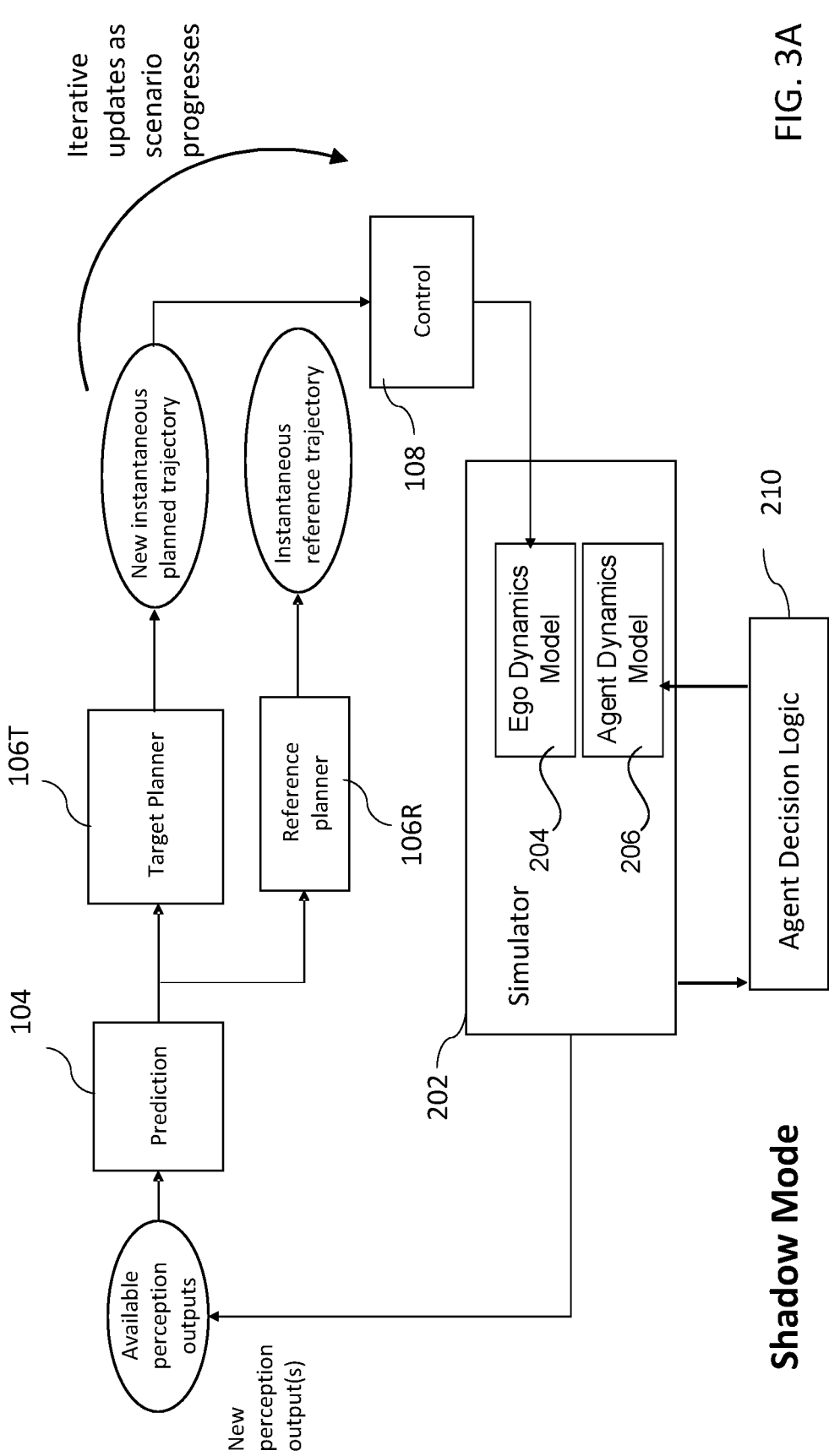
FIG. 3A a schematic block diagram of a reference planner operating in shadow mode.

FIG. 3A shows a block diagram of how a target planner 106T may be compared to a reference planner 106R running in a 'shadow mode'. As described above for FIG. 3, the target planner determines a new instantaneous trajectory at each timestep based on the current perception outputs received from the simulator and prediction outputs for other agents determined by the prediction component 104. The reference planner 106R receives the same perception and prediction inputs as the target planner 106T at each timestep, and outputs its own instantaneous planned trajectory.

The target planner 106T drives the simulation, in that the output of the target planner 106T is passed to the control component 108 which provides the input to the simulator to update the scenario. By contrast, the instantaneous trajectories predicted by the reference planner are not input to the simulator and do not affect the scenario, rather each instantaneous trajectory is collected and may be compared with the instantaneous planned trajectory of the target planner 106T for the corresponding timestep. This means that the actual trace taken by the ego vehicle is only driven by the target planner, and the reference planner follows the vehicle along this trace, 'shadowing' the target planner, and outputting an instantaneous trajectory for the vehicle at each timestep.

Note that shadow mode is only used to described the mode of the reference planner, and that the target planner is always run 'in-loop', i.e. the target planner is always run as part of the ego vehicle's driving process, determining the next steps of the ego vehicle as it progresses through the simulation.

Figure 3B:
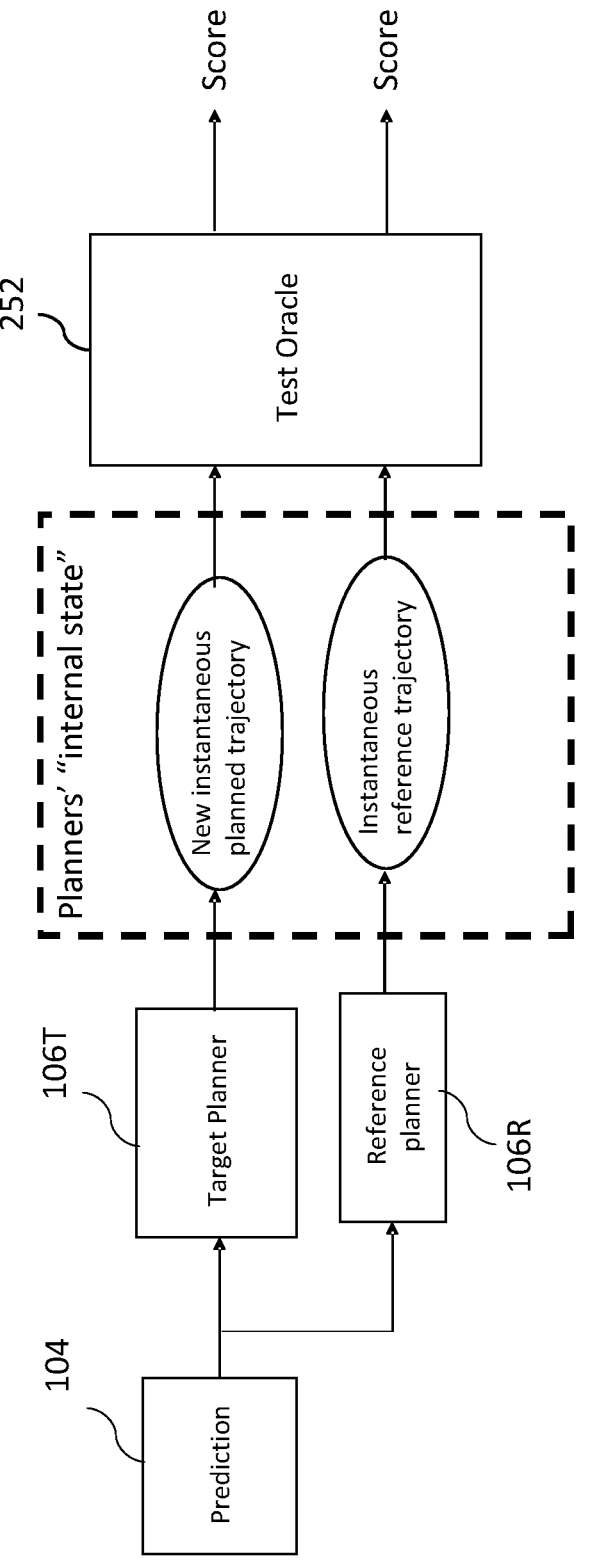
FIG. 3B shows how trajectories may be scored for a reference planner operating in shadow mode.

FIG. 3B shows the testing of the target planner against a reference planner running in shadow mode against one or more test metrics at a given timestep. For each planner, the internal state of the planner at a given time step may be defined as its instantaneous planned trajectory at that timestep. The Test Oracle 252 receives the instantaneous planned trajectory for each of the target and reference planners and compares the trajectories for corresponding timesteps (i.e. common perception and prediction inputs). The trajectories comprise position and motion parameters for the ego vehicle, from which metrics of the vehicle's respective performance along each planned trajectory may be derived and compared.

Figure 4:
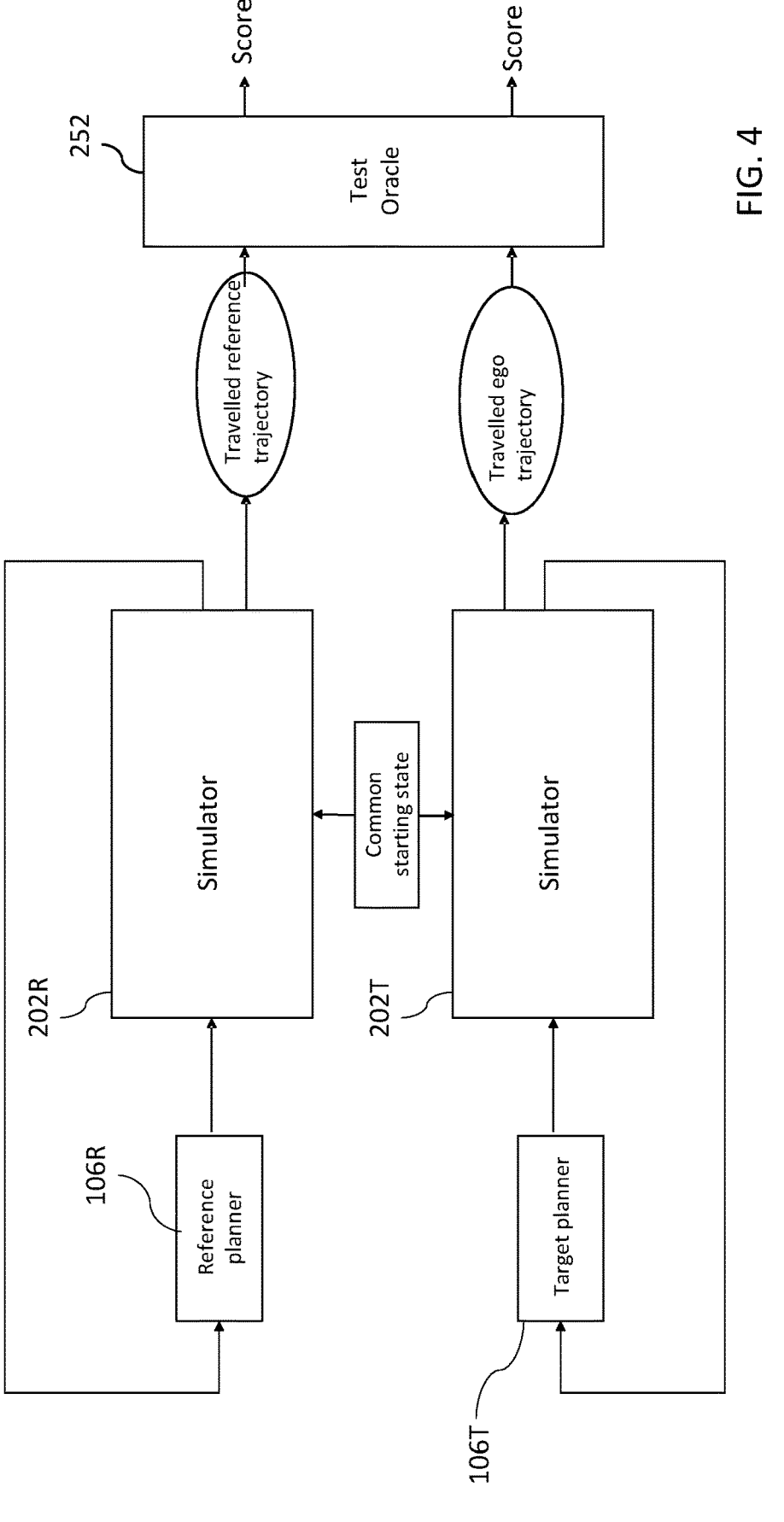
FIG. 4 shows a schematic block diagram of a reference planner operating in-the loop.

FIG. 4 is an example block diagram showing the evaluation of a target planner 106T against a reference planner 106R, with the reference planner 106T running in an 'in-loop' mode. This shows the generation of ego trajectories by a target planner 106T and associated simulator 202T and a reference planner 106R and simulator 202R. The trajectories have a common starting state but are otherwise generated independently by the respective target and reference systems.

The target planner iteratively updates its predictions and derives the ego vehicle forward along a path based on the output of its own simulator 202T. Over time, an actual trajectory taken by the ego vehicle is output to the Test Oracle. Meanwhile, the reference planner 106R drives its own simulation of the ego vehicle with simulator 202R, iteratively updating its planned trajectory and moving the ego vehicle along an independent path based on its own planner and simulation outputs, in the process described in FIG. 3. The test oracle 252 receives travelled trajectories for the ego vehicle generated by the respective planners 106T and 106R and their associated simulators 202T and 202R. These trajectories may be measured against one or more performance metrics 254, examples of which are described above.

In contrast with shadow mode, only the trajectory actually travelled by the ego vehicle is evaluated, and the instantaneous trajectories of each planner at each planning iteration are not used for evaluation. This is because, when using two different planners and travelling along two different paths, the instantaneous trajectories are planned based on different perception and prediction inputs, as the agents behave differently for the two simulated scenarios. Therefore, measuring instantaneous planned trajectories given for different starting points does not provide a useful measure of comparison. However, the two planners start from the same overall ego vehicle state, so a measurement of the actual performance of the ego vehicle along the travelled trajectory generated by each planning system is a fair measurement of the performance of the planners.

The reference planner 106R may be able to produce superior trajectories in some circumstances, because it will not necessarily be subject to the same constraints as the target planner. In particular, the target planner 106T is generally required to operate in real-time, and possibly on a resource-constrained platform (with limited computing and/or memory resources) such as an on-board computer system of an autonomous vehicle. The reference planner 106R need not be subject to the same constraints—it could be granted a greater amount of computing and/or memory resources, and does not necessarily need to operate in real time.

By way of example, reference is made to United Kingdom Patent Application Nos. 2001200.1, 2001202.7 and 2001277.9, and to F. Eiras, M. Hawasly, S. V. Albrecht, and S. Ramamoorthy, "A two-stage optimization approach to safe-by-design planning for autonomous driving," arXiv preprint arXiv:2002.02215, 2020, each of which is incorporated herein by reference in its entirety. The aforementioned disclose a multi-stage constrained optimization planner, which can robustly plan high-quality trajectories, but is not necessarily feasible to implement in real-time using state of the and hardware and solvers (at least, not without compromising performance). Such a planner could be used as a reference planner, to evaluate the performance of a real-time target planner. As will be appreciated, this is just one example of a suitable reference planner.

There are other ways in which the reference planner 106R could be used to provide a good benchmark. As described above, simulation can be implemented with simulated perception (or, more generally, observation) errors. One way is the techniques of FIG. 2A. Another way is to use simulated sensor data to which the perception system 102 is applied. One possibility is to implement the target planner with such perception errors, and to implement the reference planners without such perception errors. The metric-based comparison can then indicate whether differences between the plans were a result of observation error.

Whilst the following examples consider different target and reference planners (i.e. implementing different planning logic), the techniques can also be implemented using the target planner 106T itself in place of the reference planner 106R (i.e. using the same planning logic to implement the ego and reference trajectories), but with the target planner 102T operating in different conditions when computing reference plan(s), e.g. without perception error, or with more resources etc. This provides a way to assess whether those different conditions are material, via the structured metric-based comparison of the different trajectories the target planner produces in different circumstances. Note that all description pertaining to the reference planner 106R herein applies equally to the target planner 102T in such implementations.

Figure 5:
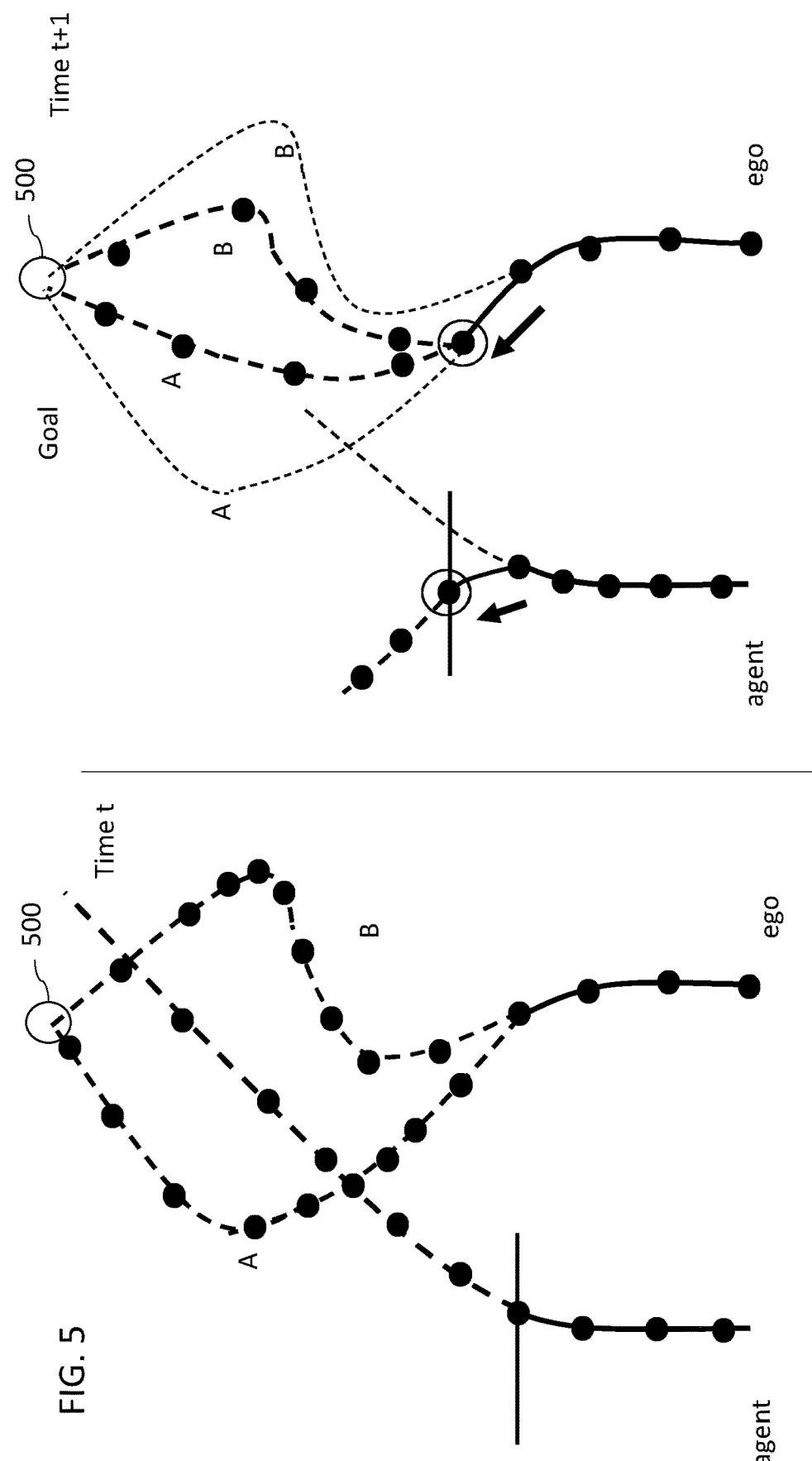
FIG. 5 schematically illustrates instantaneous reference trajectories planned by a reference planner in shadow mode at different time instants.

FIG. 5 is a simple illustration of a planned ego vehicle trajectory A for a target planner 106T (planner A) and a second planned trajectory B for a reference planner 106R (planner B) running in shadow mode. The instantaneous planned trajectories for a current timestep t are shown on the left of FIG. 5. The paths for the ego vehicle and an external agent up to the current time t are shown as a solid line, with time intervals indicated by dots along the trajectory, such that the space between two dots represents the distance covered in a single unit of time. Thus, dots spaced further apart indicate that the vehicle is moving at a higher speed.

In this example, the ego vehicle is moving towards a predetermined goal location, and an agent in the scenario is moving in the same direction. The perception system determines a state comprising position and motion variables for both the agent and the ego vehicle at regular intervals along the path. The series of observed states for the ego vehicle and the agent are used by the prediction system to produce a predicted trajectory for the agent. The predicted trajectory of the agent for the current timestep t is shown as a dashed line continuing from the agent's current trajectory in FIG. 5. In this example, the predicted trajectory of the agent shows the agent moving right, towards the path of the ego vehicle.

Both planners 106T, 106R use the agent's predicted trajectory along with the current state of the ego vehicle as determined by the perception system 102 to plan a trajectory for the ego vehicle, which includes the position and motion of the ego vehicle at a series of future timesteps, up to the predetermined goal location 500. As shown in the left of FIG. 5, at a timestep t, the reference planner 106R plans a trajectory B where the ego vehicle swerves to the right to avoid colliding with the agent vehicle and then later turns back towards the goal, when the agent has passed the ego vehicle according to its predicted trajectory. The target planner determines a trajectory A wherein the ego vehicle slows down to allow the agent to pass according to its predicted trajectory before continuing towards the goal location 500. Note that, as described earlier, the planned trajectory at any given time does not determine the final path taken by the ego vehicle, as the planner updates the trajectory in response to the new perception and prediction outputs received for each update to the ego's state.

As noted above, the instantaneous trajectories predicted by each planner for the same perception and prediction input are compared by the test oracle 252 using one or more metrics. The metrics may assess the success of the planned trajectory in achieving some pre-defined goal. For example, in the overtaking scenario of FIG. 6A, a possible metric may simply be a measure of the progress made by the vehicle in a given time frame. Planner A may determine a trajectory at the current timestep that intersects with the predicted trajectory of the other agent. However, the planner may instruct the ego vehicle to slow down as the agent passes. Planner B may plan a different trajectory where the ego vehicle avoids intersecting with the agent's predicted path altogether by turning to the right.

The controller 108 may take an action to move the ego vehicle in the direction of the trajectory planned by planner A for the current timestep. The agent simultaneously moves along its respective trajectory, which may diverge from the planned trajectory output by the prediction system 104. At the next timestep t+1, the perception system computes a new state for the agent and the ego vehicle, and the prediction system computes an updated trajectory prediction for the agent.

The right of FIG. 5 shows the update of the planned trajectory for both planners in a subsequent timestep t+1, which is shown as a dashed line from the circled point identifying the actual position of the ego vehicle at the next timestep, which shows that the simulator has moved the ego vehicle along the trajectory planned by the target planner 102T in the previous timestep. The planned trajectory for each planner for the previous timestep is also shown by lighter dashed lines. The actual motion of the agent in the most recent update is different to its predicted trajectory (also shown in lighter dashed lines). The prediction stack 104 determines an updated predicted trajectory for the agent, which now veers away from the ego vehicle's path. Each planner 106 determines an updated instantaneous trajectory from the new position of the ego vehicle using the perception input from the ego vehicle's current state and the agent's predicted motion. Both trajectories differ from the corresponding planned trajectories at the previous timestep, having determined from the agent's predicted path that the ego vehicle may take a more direct path to the goal location 500.

Note that this example shows an exaggerated scenario to illustrate the update of trajectories, where this scenario is not typical of everyday driving situations. Typically, the trajectory of the vehicle is constrained by the layout of the road, and variations between planners lie mostly in differences in velocity, acceleration, etc. along the road. In this example, the goal location remains fixed, but in other driving scenarios such as driving straight within a lane of a road, the goal location may move, for example staying a fixed distance from the ego vehicle or a fixed distance ahead of a forward vehicle in an overtaking context.

Figure 6A:
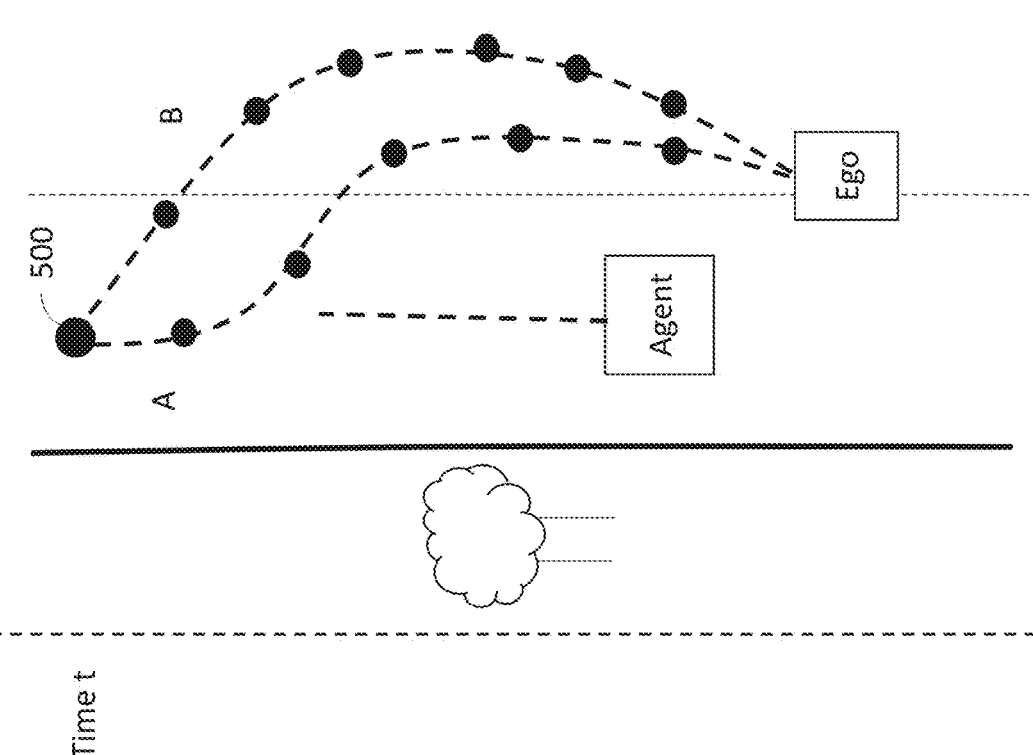
FIGS. 6A and 6B schematically depict example driving scenarios.
Figure 6A:
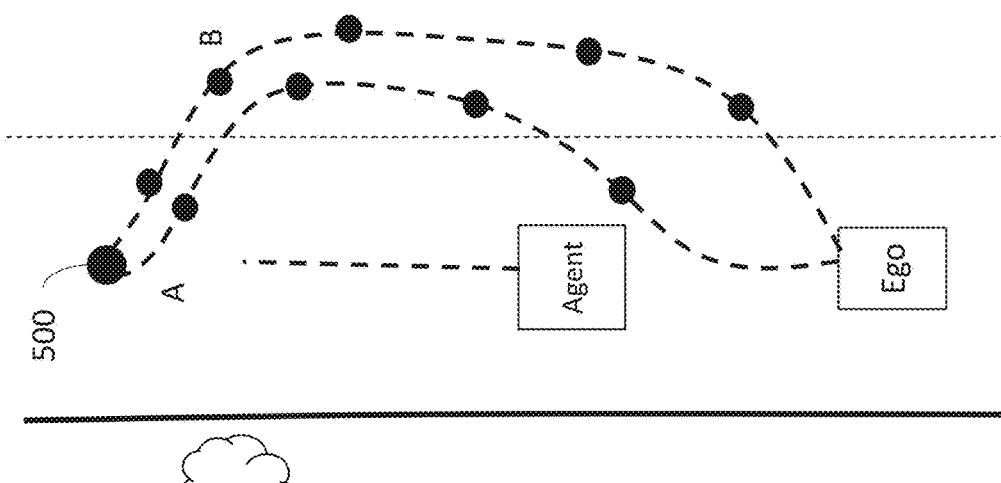

FIG. 6A shows an example of instantaneous planned trajectories for a target planner 106T and reference planner 106R for a scenario in which the ego vehicle is overtaking an agent in the same road lane.

The left of FIG. 6A shows two instantaneous planned trajectories A and B at a current timestep t. At this timestep, the ego vehicle is behind the agent, and the predicted trajectory of the agent given by the prediction stack 104 is a straight trajectory along its current lane. The target planner 106T determines an instantaneous trajectory A towards the goal location 500, in which the ego vehicle overtakes the agent closely, without fully entering the opposite driving lane. The reference planner B determines a slightly different planned trajectory for the ego vehicle, which leaves a wider gap between the ego vehicle and the agent vehicle during the overtaking maneuver.

The right of FIG. 6A shows the instantaneous trajectories determined by each planner at a later time t+1. The positions of both the ego vehicle and the agent have been updated by the simulator 202 using respective agent and ego vehicle dynamics. The ego vehicle has begun an overtake maneuver according to the previous planned trajectory A determined by the target planner 106T. The target planner determines a new instantaneous trajectory towards an updated goal location 500, which remains a fixed distance ahead of the ego vehicle. The new trajectory plans to pass the agent while staying close to the centre of the road and without fully entering the opposite lane. The reference planner determines an updated planned trajectory in which the ego vehicle moves further into the opposite lane and overtakes the agent vehicle while maintaining a larger distance. The trajectories may be compared against a number of metrics in the test oracle 252. Examples of metrics that may be applicable to this driving scenario are progress of the ego vehicle over time, and the distance of the ego vehicle from the agent during the overtake maneuver.

Figure 6B:
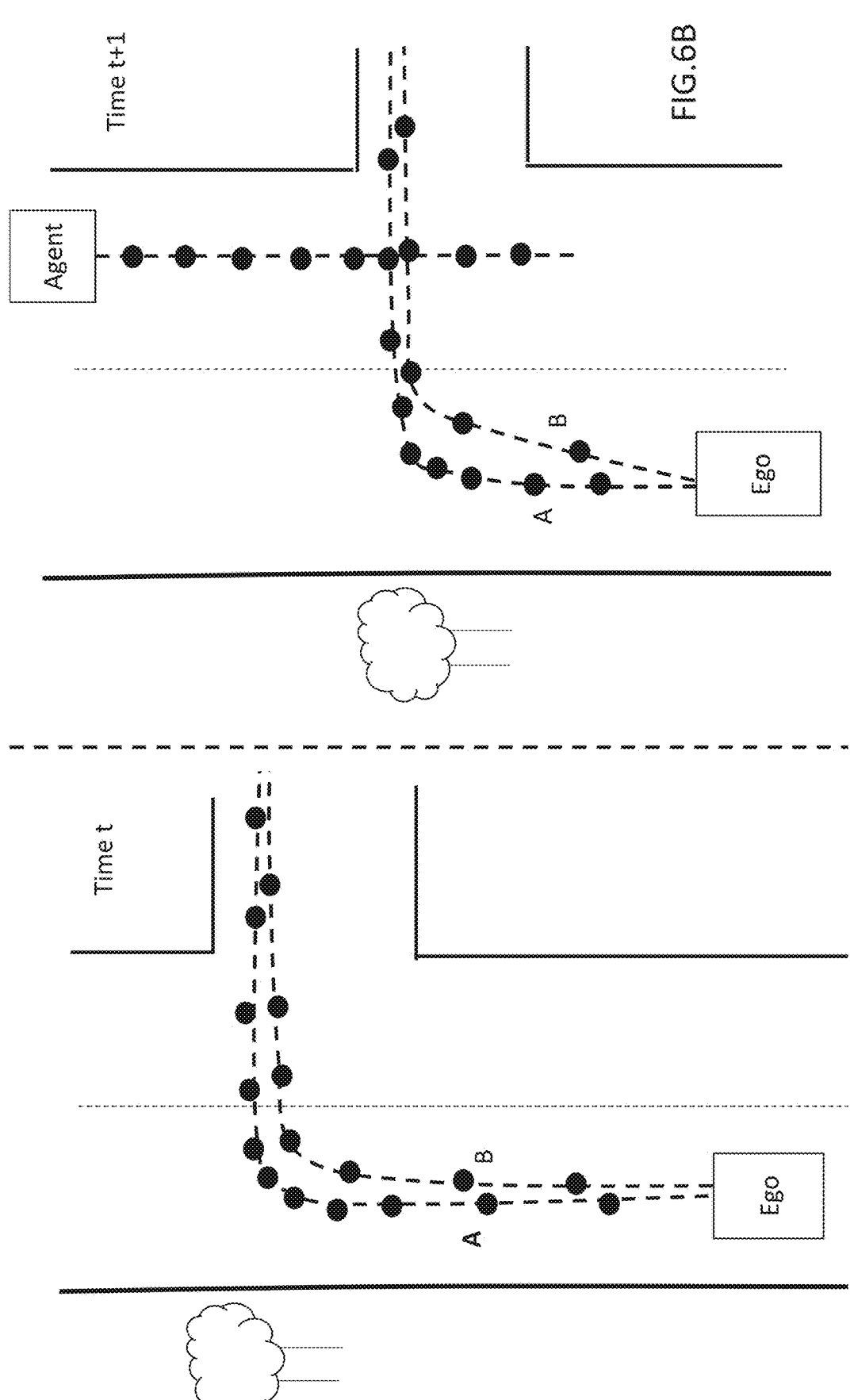

FIG. 6B shows an example of two instantaneous planned trajectories A and B planned by a target planner 106T and a reference planner 106R respectively at a current timestep t and a subsequent timestep t+1 where the goal determined for the ego vehicle is turning right. On the left of FIG. 6B, the two planners plan similar paths, in that the position of the ego vehicle is almost the same along both planned trajectories. However, as shown by distribution of the ego vehicle states, shown by the black dots, the speed of the vehicle differs between the two planners. Planner A has generated a slower predicted trajectory, with the ego vehicle slowing down significantly before turning right, where the planned reference trajectory approaches the turn at a higher speed, and the ego vehicle is planned to slow down to a lesser extent before making the turn into the road.

The right of FIG. 6B shows the update of the two planned trajectories at a subsequent timestep t+1. An agent vehicle now moves along the road in the opposite lane, and its predicted trajectory is to continue straight along that lane. The target planner 106T now plans a trajectory A in which the ego vehicle slows down to a stop, allowing the agent to pass in the opposite lane before turning right. However, reference planner 106R still approaches the turn at a higher speed and slows down only slightly, turning before the agent vehicle passes the turn in the opposite lane. This may be because the reference planner has determined that at the current motion of the ego vehicle and the agent, there is enough time to turn before the agent vehicle passes, where the target planner may have determined that this should not be done. Different planners may prioritise different driving requirements differently, such as safety and progress, and determine different planned behaviours based on their respective combination of driving objectives.

Figure 7:
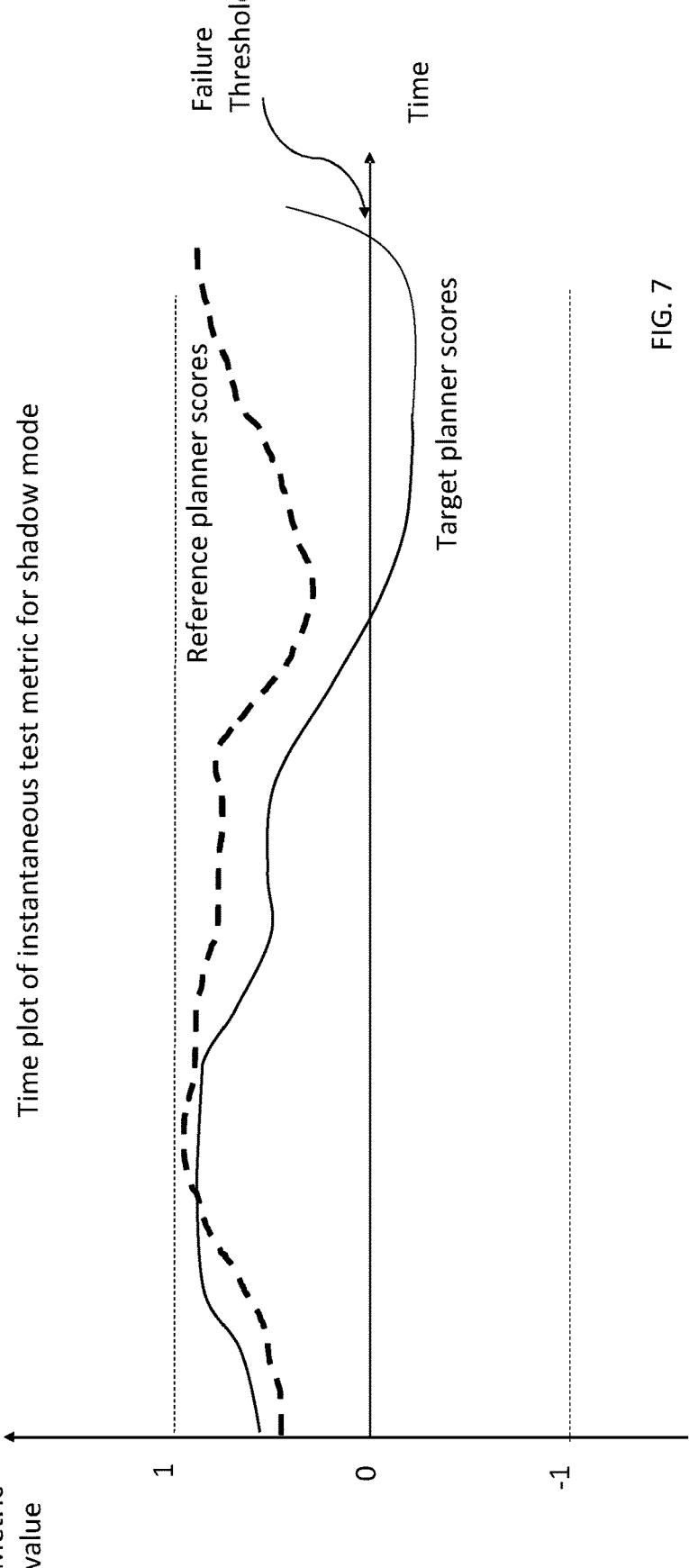
FIG. 7 shows a time-plot of metric-based scores assigned to instantaneous ego and reference trajectories over a time interval.

Respective trajectories may be passed to the test oracle 252 to be evaluated based on one or more metrics which test the performance of the ego vehicle. FIG. 7 shows an example time plot of a single test metric for an instantaneous planned trajectory planned by a target planner 106T and a reference planner 106R running in shadow mode (i.e. along the same travelled trajectory, driven by the target planner, as described in FIG. 3A). An example test metric by which to measure the trajectories is the progress of the ego vehicle over time. The distance covered by the ego vehicle in a given time interval may be converted to a score and normalised to a predetermined scale. In this example, the test metric is measured as a score ranging from −1 to 1. The score of the respective instantaneous trajectory for each of the target planner 106T and the reference planner 106R is calculated at each planning step, i.e. the progress over time of the full instantaneous trajectory is calculated for each planner at a given planner step. A threshold of failure may be chosen, which defines the minimum allowable score for the given metric. For example, the progress of the ego vehicle may be required to be higher than some given distance in a pre-defined time interval. The normalisation of the planner scores may be determined such that the failure threshold is set at 0.

As shown in FIG. 7, the target planner falls below the failure threshold for a time interval, which means that the instantaneous planned trajectories planned during that time interval do not make sufficient progress. In the overtaking example of FIG. 6A, the target planner may, for example, plan a trajectory in which the ego vehicle waits behind the agent vehicle for a period of time until all agents have passed in the opposite lane, which may cause the planned trajectory to fail on the progress metric. Meanwhile the reference planner may determine that it is safe to overtake before an approaching agent vehicle passes in the opposite lane, and thus the progress score is high for that planned trajectory. Failure thresholds may encode rules for driving and may be defined in the 'Digital Highway Code'. As described above, planners may be evaluated on a range of test metrics, where progress is just one example.

Figure 8:
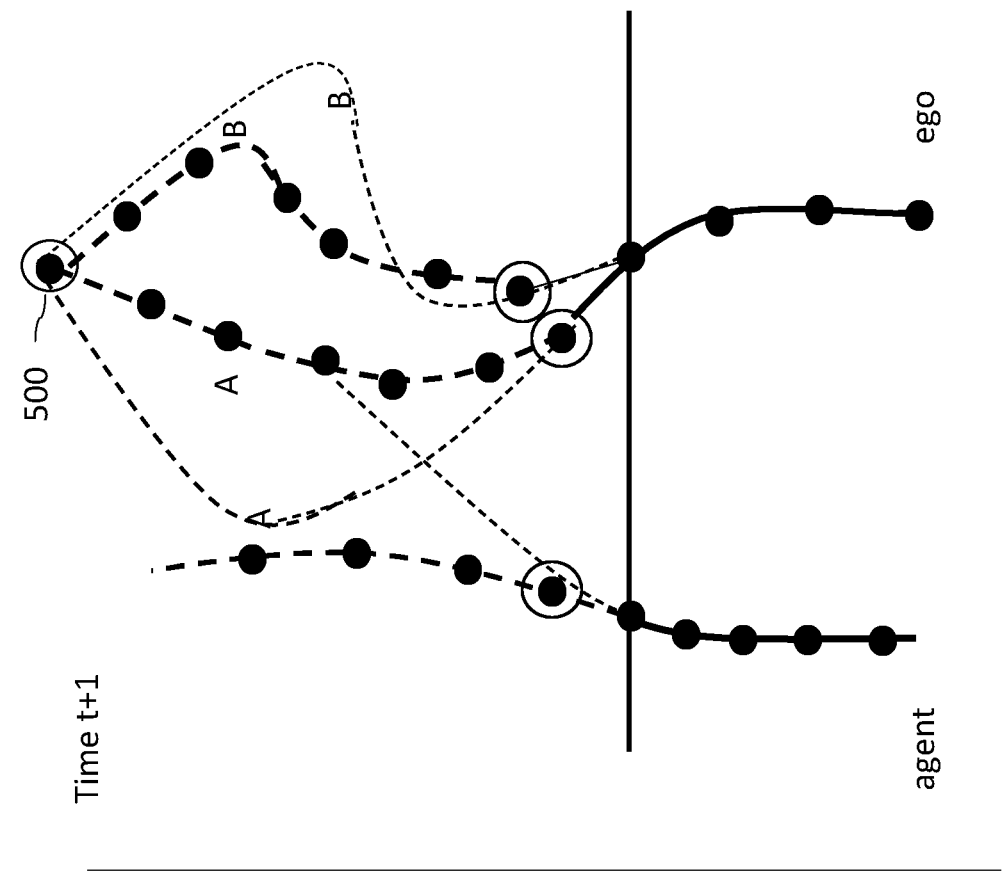
FIG. 8 schematically illustrates how actual trajectories are produced by target and reference planers both operating in-the loop.
Figure 8:
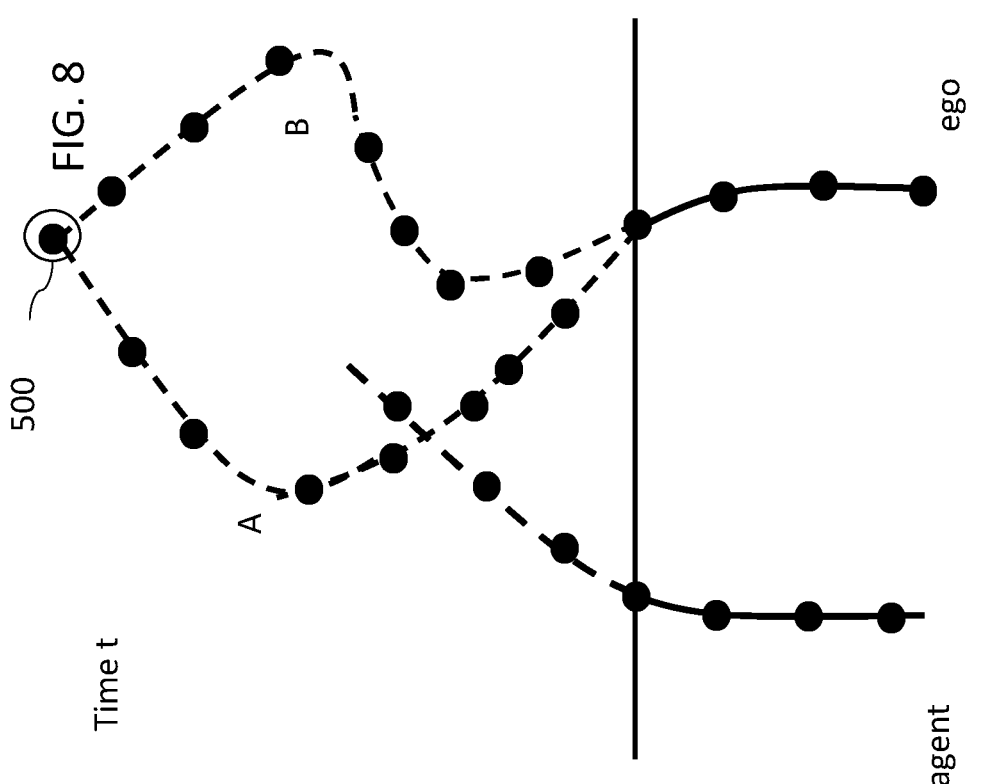

FIG. 8 shows the update of the planned trajectory at each timestep for each planner in an 'in-loop' mode. That is, with the reference planner also applied in-the-loop. On the left, the two planners determine a planned trajectory for the current timestep given the current state of the ego vehicle and the predicted path of the agent. At a second timestep, the planners each make new predictions based on the ego vehicle's state as updated according to the planned trajectory of each planner. In this case, the ego vehicle state diverges for each planner after the first timestep.

In in-loop mode, the planners are compared only by the actual trace of the ego vehicle, which comprises its position and motion at each timestep until the goal location is reached. The instantaneous trajectories output by the planners along the path are not used for evaluation. Thus, in-loop mode compares the planners based on the real motion of the ego vehicle, where the motion depends on an accumulation of multiple trajectory updates determined for instantaneous planner decisions. However, the intermediate decisions of the planner at any given point along this path are not used for evaluation in this mode.

When evaluating a target planner 106T against a reference planner 106R in a shadow mode, the reference planner 106R must be provided with an identical perception input and prediction to the planner 106T. This provides both planners with the same starting point, so that the traces of the two planners may be compared directly. For example, a metric measuring the time taken from the starting point to completing a goal of entry on the roundabout, the time taken for each trace can be directly compared. A common initial state is required to compare the traces of the two planners, since any change to the perception output affects the predicted behaviour of other agents in the scenario. It would not be possible to determine whether any difference between traces output in this case are due to the different initial states of the ego vehicle or differences between the planners.

Figure 9:
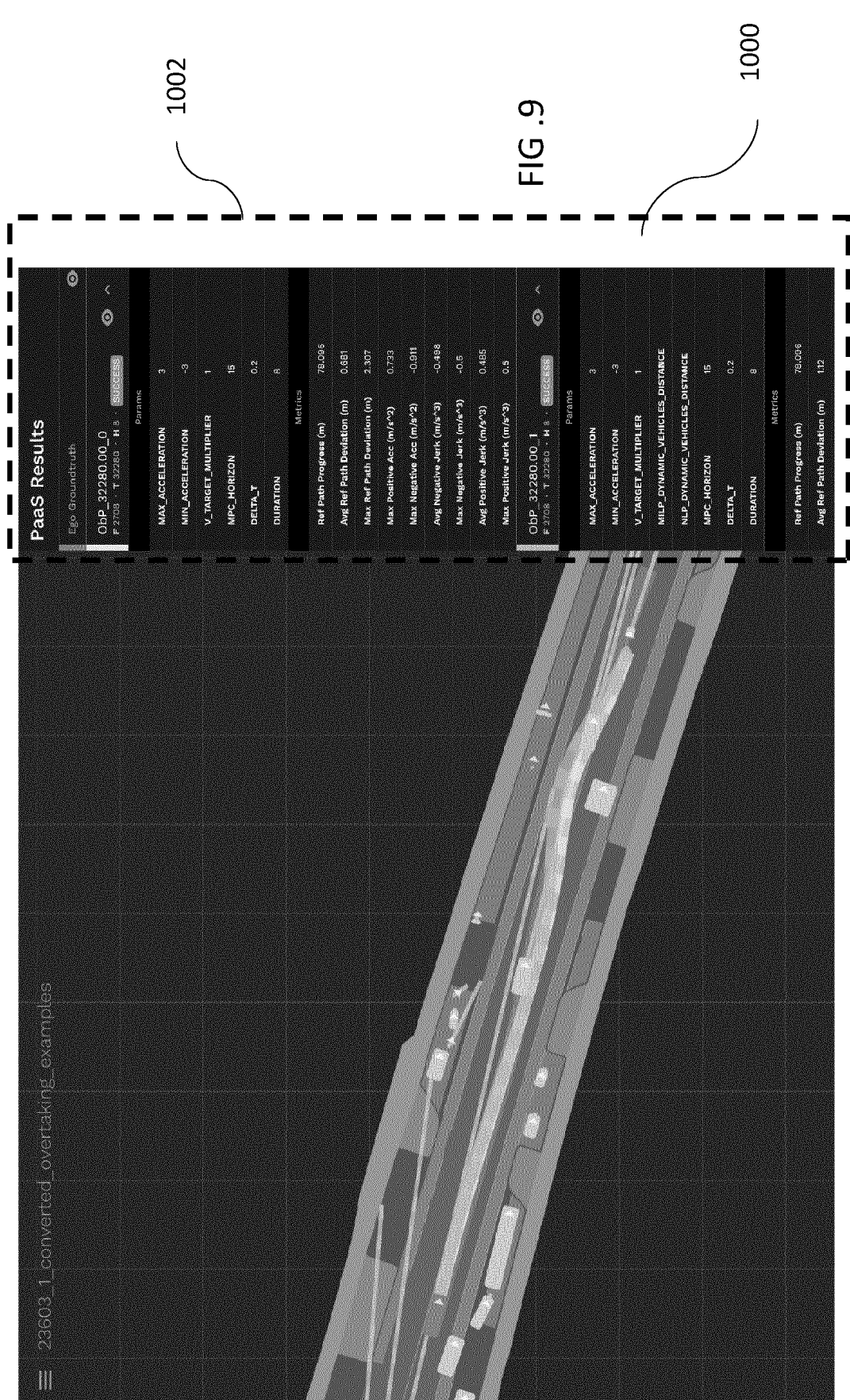
FIG. 9 shows an example of a user interface for metric-based scores for comparing different trajectories.

The planned trajectories for the respective target and reference planners and the metrics used to evaluate these planned trajectories may be presented to a user in a user interface 1000, which is connected to the test oracle 252. FIG. 9 shows an example scenario which may be presented in the user interface 1000, wherein the goal of the ego vehicle is to overtake an agent moving in the same direction along the road. The predicted trajectories of the agents in the scenario are shown by thin green lines. The planned trajectories are shown for a target planner 106T and a reference planner 106R, where the reference planner is running in shadow mode, i.e. the ego vehicle state is updated based on the target reference planner 106T and the instantaneous trajectory planned by the reference planner 106R begins from the same ego vehicle state as the planned trajectory for the target planner 106T for a given timestep.

In the example shown in FIG. 9, the simulation of the ego vehicle's path has been carried out for the scenario, and the trajectory actually taken by the ego vehicle in simulation is shown as a 'ground truth' ego vehicle trajectory, in blue. The user may select, for example by clicking with a cursor at some point along the ego vehicle's ground truth trajectory, an initial state for the ego vehicle from which target and reference planners' instantaneous planned trajectories are generated. In FIG. 9, the instantaneous planned trajectory is shown for the target planner as a thick green line, and the instantaneous planned trajectory for the reference planner 106R is shown as a thick yellow line.

The reference planner trajectory may be obtained for the given ego vehicle state by sending a request to the API as described above, where the resulting trajectory is rendered in the UI based on the information received from the API. The API request may be sent as soon as a user selects an initial ego vehicle state from which to generate the planned trajectories.

Metrics associated with each planned trajectory are displayed to the user in a results pane 1002. The user interface 1000 is not limited to displaying metrics for the respective trajectories of a single target planner and a single reference planner starting from the same ego vehicle state. For example, metrics may be displayed for trajectories of the same planner starting from different ego vehicle states along the ground truth path travelled by the ego vehicle.

The user may display the metrics for the relevant trajectory by selecting a point along the ego 'ground truth' trajectory as the initial state of the planned trajectory and by selecting the planner for which the metrics should be displayed. For example, in FIG. 9, the results pane 1002 displays a set of parameters and calculated metrics for the instantaneous metrics of two different on board planners (shown in yellow and green) for the same initial state of the ego vehicle and predicted agent behaviour. If any metric falls below the defined failure threshold, as described above with reference to FIG. 7, the user interface 1000 may display a failure signal in the results pane 1002 for the selected trajectory. If the trajectory does not fall below the failure threshold for any defined metric, a success signal may be displayed in the results pane 1002.

Metrics can be selected by the user from any available trajectory and compared. Metrics may include, but are not limited to, progress along a path, average or maximum deviation from some predefined path, average or maximum acceleration or deceleration, and average or maximum positive or negative jerk (rate of change of acceleration).

In the particular case described above, where the target planner trajectory is to be compared with the reference planner trajectory over the course of the actual ego 'ground truth' path, the user may select, from the metrics presented, which metrics should be used to compare and evaluate the planned trajectories. The user may use the selected metrics to generate a time plot for the target and reference planner over the ego vehicle ground truth trajectory, as described with reference to FIG. 7.

For a reference planner running in in-loop mode, the user interface 1000 may display two separate scenarios, one for each planner. The metrics of the trajectory actually travelled may be displayed on the results pane 1002 for each scenario, since the agent behaviour and path of the ego vehicle differs for each planner when the reference planner is run in this mode. In this case, however, the user may still view metrics associated with the ego vehicle's path for each planner, and may compare these metrics for the two trajectories, given the same initial ego vehicle state. As described above for shadow mode, metrics may include progress, deviation and positive and negative acceleration and jerk.

In the example of FIG. 9, each trajectory is defined in relation to a predetermined reference path (e.g. defined so as to follow the shape of the road). The planners are permitted to deviate from the reference path, though their objective is to follow the reference path where possible.

FIG. 9 shows examples of scores assigned to the trajectories individually, but with respect to the same metrics to facilitate a meaningful comparisons by the user, namely:

Progress along the reference path,

Deviation in the trajectory from the reference path (maximum and average),

Maximum acceleration along the trajectory (positive and negative),

Maximum and average jerk, i.e. rate of change of acceleration, along the trajectory (positive and negative).

Such metrics can be applied both to instantaneous trajectories in shadow mode, and actual trajectories in in-the-loop mode.

Whilst FIG. 9 depicts individual trajectories, similar comparative metrics could be defined, to provide scores that encode the comparisons (e.g. relative progress, deviation, jerk, acceleration etc. between the trajectories).

Whilst the above description of shadow mode assumes the target planner 106T and reference planner 106R are applied at the same time instant of the scenario, the UI of FIG. 9 is more flexible. It allows the reference planner to be implemented at a different time instant, e.g. some set amount time from the time instant at which the target planner 106T is applied (the set amount of time could be user-configurable parameter). For example, the UI allows the user to request a metric evaluation of the instantaneous trajectory produced by the target planner 106T as some time instant, together with a metric evaluation of the instantaneous trajectory produced at some later time step, either by the same target planner 106T or some other reference planner 106R.

Training Application

The above techniques can also be applied in training. Reference is made to International Patent Publication No.

WO2021/152047 and United Kingdom Patent Application No. GB2017252.4, the contents of which are incorporated herein by reference in their entirety. Therein is described a form of imitation learning where a function approximator (the target planner, in this context) is trained to imitate a constrained-optimization based planner, using Dataset Aggregation (DAgger) training.

In that context, a reference planner operating in shadow mode can be queried to provide additional training examples to augment the training set with problems (scenario states) encountered by the target planner, to allow re-training of the target planner.

Typical supervised learning problems assume the data-generation process is iid (independent and identically distributed). In the case of autonomous driving, this assumption is flawed. For effective driving, a key aspect is the accumulation of errors across time. The distribution of 'problems' (scenario states) seen by an agent when driving depends on that agent's previous actions. If the ego's actions lead to problems that lie outside the domain of demonstrations seen by the learner, then the learner's planning relies on generalisation.

A scenario state in this context is a snapshot of a scene at a given time instant with an ego (simulated agent or real vehicle) to plan for and all other agents' trajectories having been predicted.

The following solution (referred to as "PILOT") improves the efficiency of an expensive-to-run planner (the reference planner, having the role of "expert" in the present imitation learning context), such as an optimisation-based planner. The input to the planning problem is assumed to be given by $s \in \mathbb{R}^d$, and the goal of the planning to obtain a sequence of states $\tau^* \tau_{i_{i=1, \ldots, N}} \in \mathbb{R}^{Nd}$ such that it optimises:

$$\operatorname*{argmin}_{\tau} \mathcal{J}(\tau) \qquad \text{(D-1)}$$

$$\text{s.t. } \tau_0 = s, \, g(\tau) \leq 0, \, h(\tau) = 0$$

where $g=(g_1, \ldots, g_L)$ and $h=(h_1, \ldots, h_M)$ are possibly nonlinear, non-convex inequality and equality constraints on the planning states, and $\mathcal{J}$ is a cost function defined over the plan. Whilst globally solving this optimisation problem is known to be NP-hard [D-23], [D-24], there are efficient solvers that compute local solutions within acceptable times in practice assuming a sensible initial guess is provided [D-25], [D-26]. Here, $v$ is defined to be an efficient optimiser that solves Eq. D-1 (e.g. optimiser in [D-25]), and $\Omega$ to be an expert expensive-to-run optimisation procedure that attempts to improve upon the local optimum of Eq. D-1 found by $v$. Examples of $\Omega$ can include performing a recursive decomposition of the problem and taking the minimum cost [D-27] or applying other warm-starting procedures [D-4], [D-28].

The goal of PILOT is to achieve the lower cost on $\mathcal{J}$ provided by $\Omega$, while approximating the efficient runtime of $v$. To do so, PILOT employs an imitation learning paradigm to train a deep neural network, $\mathcal{N}_{\xi\Theta}$ (900, FIG. 9), that imitates the output of $\Omega$, which it then uses to initialise $v$ in order to output a feasible and smooth trajectory.

In order to achieve that, a neural network 900 is pre-trained on a dataset of problems labelled by the expert, $\mathcal{D}_0 = \{(s_i, \tau_i)\}_{i=1, \ldots, n}$. Then, using the trained network as the planner in a simulator, a DAgger-style training loop [D-17] is employed to adapt to the covariate shift between the training dataset and the learner's experience in the simulator. See Algorithm 1. In principle, a well-trained neural network could be used at deployment time as a proxy to $\Omega$ if it produces feasible trajectories similar to the outputs of the expert in problems close to the ones in the training set. However, the raw output of a neural network is not guaranteed to satisfy solution optimality and the constraints without major investments in robust training [D-29], [D-30] or post-hoc analysis [D-31]. Instead, the neural network $\mathcal{N}_{\xi\Theta}$ to initialise $v$ so as to maintain safety and smoothness guarantees. See Algorithm 2.

---

Algorithm 1: PILOT TRAINING PROCEDURE input:     initial dataset $\mathcal{D}_0 = \{(s_i, \tau_i)\}_{i=1,\ldots,n}$, initial
           state $s_0$, expert expensive-to-run planner $\Omega$,
           simulator $\mathcal{S}$, maximum iterations T
output:    trained network parameters $\theta$
Initialise $\mathcal{D}$ to $\mathcal{D}_0$
Initialise j to 1
$\theta \leftarrow$ TRAIN($\mathcal{N}, \mathcal{D}$)
while j < T do
|      Obtain $s_j$ by stepping in $\mathcal{S}$ with $\mathcal{N}_\theta(s_{j-1})$
|      Get $\tau_j$ by optimising $\mathcal{J}$ using $\Omega$ given $s_j$
|      Update $\mathcal{D}$ to $\mathcal{D} \cup \{(s_j, \tau_j)\}$
|      // retrain network every K steps
|      if j mod K = 0 then
|      |   Update $\theta \leftarrow$ TRAIN($\mathcal{N}, \mathcal{D}$)
|      end
|      j $\leftarrow$ j + 1
end
return $\theta$

---

Algorithm 2: PILOT INTERFERENCE STEP input :    state s, efficient planner $v$, trained imitation
           network $\mathcal{N}_\theta$
output:    optimal plan $\tau^*$
Obtain initial guess $\tau' \leftarrow \mathcal{N}_\theta(s)$
Get $\tau^*$ by optimising $\mathcal{J}$ using $v$ given s and $\tau'$
return $\tau^*$

---

A. Two-Stage Optimisation-Based Motion Planner

Figure 10:
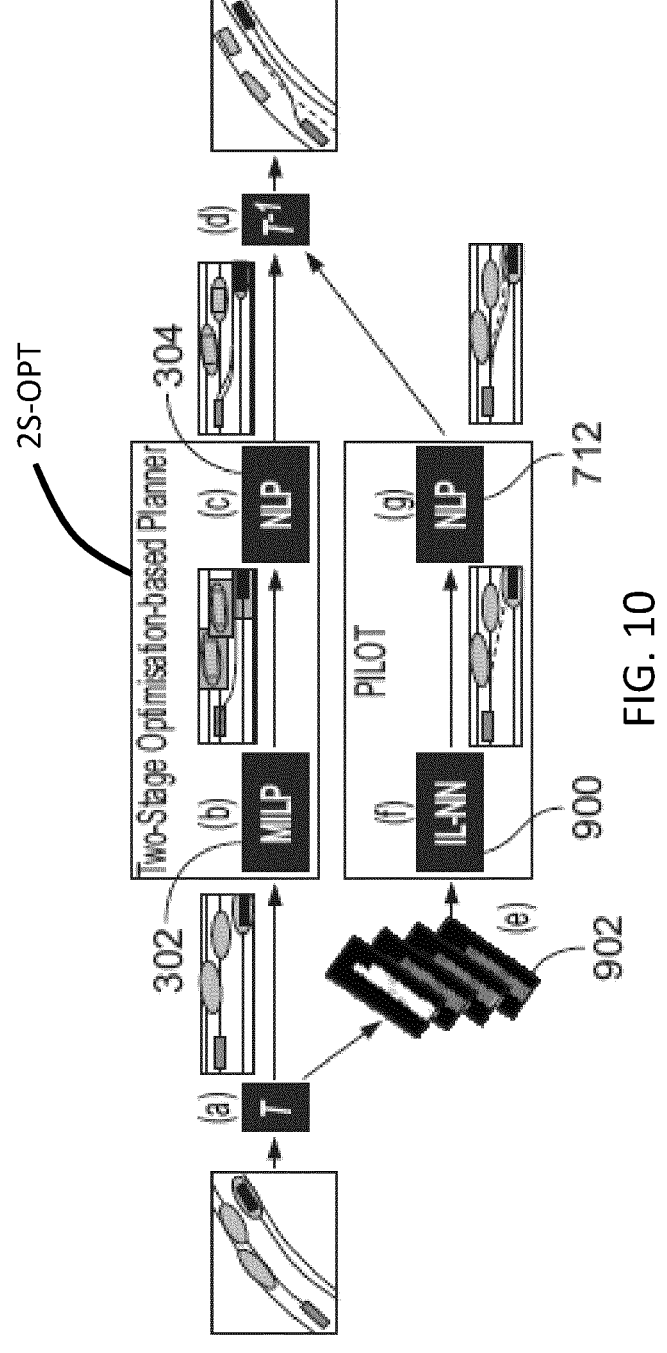
FIG. 10 shows a reference planner and a neural network trained to imitate the reference planner through imitation learning.

FIG. 10 (top) shows the architecture of a two-stage optimization-based planner (2s-OPT), as in FIG. 3. The input to the system are: 1) a birds-eye view of a planning situation, that includes an ego vehicle, other road users and the relevant features of the static layout; 2) a route plan as a reference path, provided by an external route planner; and 3) predicted traces for all road users, provided by a prediction module.

In 2s-OPT, projecting the world state and road user predictions into a reference path-based coordinate frame produces the input to the optimisation. A first optimisation stage 302 solves a linearised version of the planning problem using a Mixed Integer Linear Programming (MILP) solver. This minimises a cost function that encodes desirable plan features, such as passenger comfort and progress along the reference path, while satisfying hard constraints that encode safety requirements. The output of the MILP solver is fed as a warm-start initialisation to a constrained, nonlinear optimiser 304. This second optimisation stage ensures that the output trajectory is smooth and feasible, while maintaining the safety guarantees.

As discussed above, although the framework produces superior outputs when compared to alternatives with regard to solution quality (measured by convergence guarantee and output cost values), it suffers from the limitation of pure optimisation approaches in solving time, as the method effectively trades off efficiency for better solution quality.

B. Implementation Details

The following examples use an in-the-loop DAgger [D-17] approach to imitation learning to train a deep neural network to imitate the output of an expert planner. Online augmentation using DAgger enriches the learner's dataset with relevant problem settings that might be lacking in the expert planner's dataset. This benefits from the fact that (unlike a human expert) the expert planner of FIG. 3 is always available to update the training dataset and label new instances experienced by the learner with expert output, leading to much reduced training cost compared to using human expert data. Also, this targeted augmentation is in contrast to other dataset augmentation techniques that rely on random perturbations to the expert problems, e.g. [D-19], [D-21].

Referring to FIG. 10 (bottom), a convolutional neural network 900 is configured to take as input a graphical representation 902 of a reference path-projected planning situation (including predictions of other road users) in addition to other scalar parameters of the problem (e.g., speed of the ego vehicle), and output a smooth trajectory that imitates the output of the optimiser when presented with the same problem. The expert planner (2S-OPT) is run on a dataset of problems to initiate the training, and used to label the new planning problems generated by the learner in simulations. The post-hoc optimizer 712 implements a non-linear constrained optimisation stage, similar to the second stage 304 in 2s-OPT to maintain safety and smoothness guarantees.

In the present example, the expert planner has the form of a two-stage optimization-based planner (2S-OPT), as taught in WO2021/152047, comprising a linear optimization stage 302 that seeds a non-linear optimization 712. However, the present techniques can be used to train a neural network (or other function approximator) to imitate any form of planner.

Further details of the reference path-based representation are described below.

1) System architecture: FIG. 10 (bottom) shows an example system architecture incorporating a trainable neural network 900 that imitates the expert planner 2S-OPT. After the planning problem is transformed (using a transform $\mathcal{T}$) from a global coordinate frame to a reference path-based coordinate frame, a sequence of images 902 of the scene are then produced to encode the predicted future of dynamic road users. These images 902 are part of the input to the neural network 900. The output of the network 900 is a trajectory in the reference path coordinate frame, which is used as a warm-start initialisation for a constrained, nonlinear programming (NLP) optimisation stage 712 to enforce certain desired qualities of the output trajectory. Finally, the optimiser's output is then transformed back to the global coordinate frame by the inverse transform $\mathcal{T}^{-1}$.

2) Network input representation: The planning problem input comprises the static road layout, road users with their predicted trajectories, and a reference path to follow. As the problem is transformed to the reference path coordinate frame, the transformed scene is automatically aligned with the area of interest—the road along the reference path. This simplifies the representation to the neural network 900.

To encode the predicted trajectories of dynamic road users, C greyscale top-down images of the scene of size W×H are produced by uniformly sampling in time the positions of road users along their predicted trajectories at times $t \in 0$, $$\frac{h}{C-1}, \dots h$$

for the planning horizon h. These images create an input tensor of size C×W×H, allowing convolutional layers to be used to extract semantic features of the scene and its temporal evolution. The static layout information is present on all channels.

Additional information of the planning problem that is not visualised in the top-down images (such as the initial speed of the ego vehicle) are appended as scalar inputs, along with the flattened convolutional neural network (CNN) output, to the first dense layer of the network.

Figure 12:
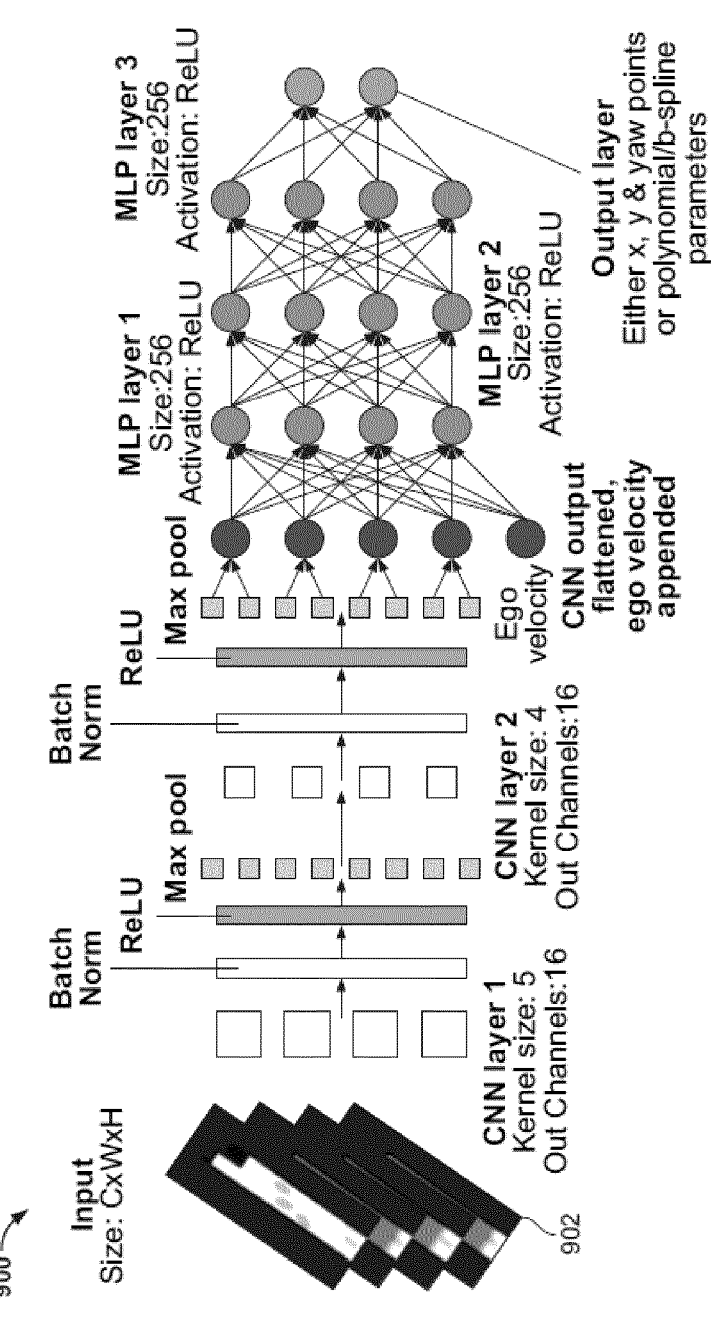
FIG. 12 shows an example network architecture trainable to imitate a reference planner.

FIG. 12 shows further details of an example convolutional architecture for the neural network 900.

3) Network output representation:

The output of the network 900 is a trajectory in the reference path coordinate frame. One possibility is to output a tensor of size 2×(h·f) for a planning horizon h and planning frequency f, encoding timestamped spatial points $\tau = \{(x_j, y_j)\}_{j=1, \dots, N}$. To enforce output smoothness, an alternative is to train the network to produce parameters for smooth function families, e.g. polynomials and B-splines, over time, namely $f_x(t)$ and $f_y(t)$.

The post-hoc NLP optimisation stage 712 expects as input a time-stamped sequence of states, each comprising: (x,y) position, speed, orientation and control inputs (steering and acceleration), all in the reference path coordinate frame. Velocities and orientations are calculated from the sequence of points produced by the network (or sampled from the smooth function output). Control input is derived from an inverse dynamics model. The NLP optimization stage is an optional addition that guarantees that certain constraints are met in the final trajectory; see WO2021/152047 for further details.

4) Neural network training:

a) Pre-training: The neural network 900 is trained to imitate the output of the expert planner 2s-OPT. In a supervised learning fashion, the expert data is produced by running the expert planner 2s-OPT in problems generated by simulating various configurations of driving instances to create a training dataset $\mathcal{D}_0 = \{(s_i, \tau_i^{exp})\}_{i=1, \dots, n}$. The training loss is defined as the $L_2$ norm distance between the expert trajectory and the network output:

$$\min_{\theta} \sum_{\mathcal{D}} \left[ \sum_{k=0}^{N} \left( x_k^\theta - x_k^{exp} \right)^2 + \left( y_k^\theta - y_k^{exp} \right)^2 \right]^{\frac{1}{2}}, \tag{D-2}$$

where $\theta$ refers to the neural network parameter vector, $\mathcal{D}$ is the dataset of training examples, and the identifier exp indicates an expert trajectory from the dataset. An ADAM optimiser [D-32] is used to determine update step sizes.

b) DAgger training: Dataset Aggregation (DAgger) [D-17] is a training regime that reduces the difference between the distribution of the problems in the expert dataset and the distribution of problems seen by the learner when interacting with its environment. It does this by augmenting the training dataset online with additional problems generated by the pre-trained learner network when interacting with the environment in simulation. A requirement of DAgger is an interactive expert that can be queried for solutions to the new problems in a scalable way. This is satisfied in our case by the 2s-OPT which labels the new problems with high quality solutions. The DAgger process alternates between problem generation in the simulation and training the network as described in Algorithm 1.

Expanding on the benefits of DAgger training, typical supervised learning problems assume the data-generation process is iid (independent and identically distributed). In the case of autonomous driving, this assumption is flawed. For effective driving, a key aspect is the accumulation of errors across time. The distribution of 'problems' (scenario states) seen by an agent when driving depends on that agent's previous actions. If the ego's actions lead to problems that lie outside the domain of demonstrations seen by the learner, then the learner's planning relies on generalisation.

A scenario state in this context is a snapshot of a scene at a given time instant with an ego (simulated agent or real vehicle) to plan for and all other agents' trajectories having been predicted.

Figure 11:
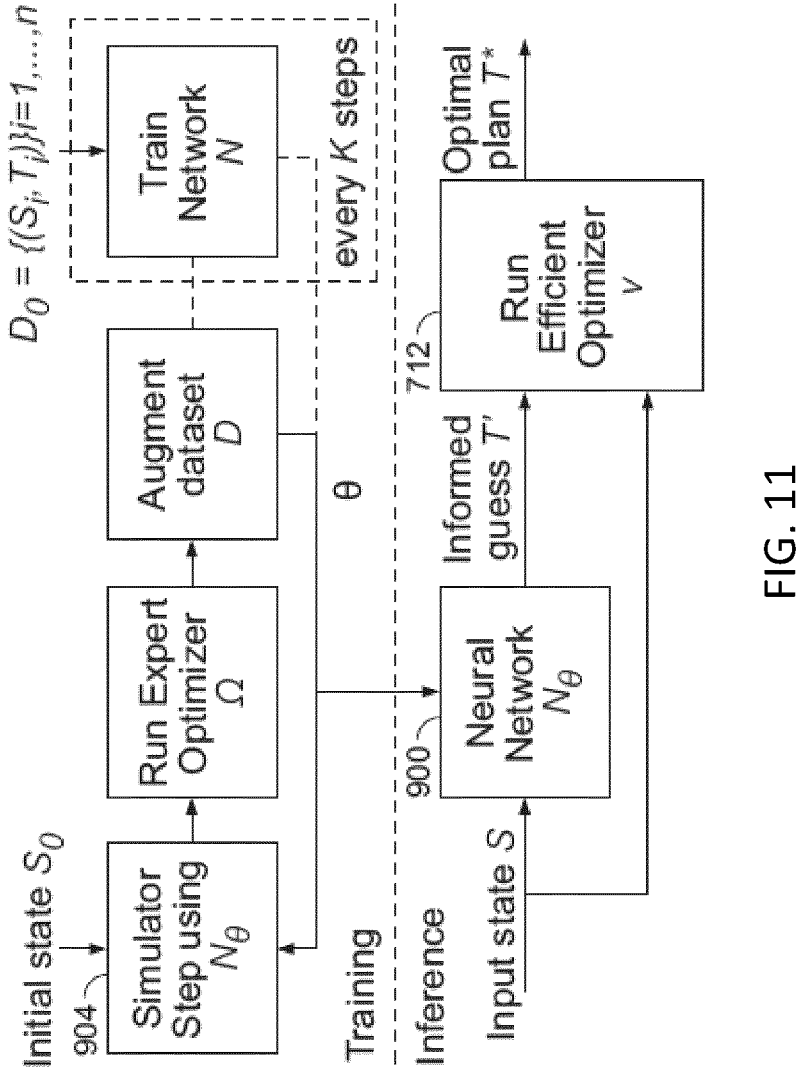
FIG. 11 shows a schematic block diagram for a imitation learning training scheme.

FIG. 11 shows a schematic block diagram of a training scheme (referred to as the "PILOT" scheme herein). PILOT uses an expert-in-the-loop imitation learning paradigm to train a deep neural network, $\mathcal{N}_{\epsilon\theta}$ (900), that imitates the output of the expensive-to-run optimisation-based planner $\Omega$ (top). At inference time, it uses the output of $\mathcal{N}_{\epsilon\theta}$ to initialise an efficient optimiser $\nu$ (712) to compute a feasible and low-cost trajectory (bottom).

As per Algorithm 2, the scheme alternates between training steps and augmentation steps. The first training set is performed on a large dataset $\mathcal{D}_0$ of examples obtained using the reference planner $\Omega$. In each subsequent training step, the parameters $\theta$ are tuned via training on an augmented training set $\mathcal{D}$, as augmented in the previous augmentation step. In each augmentation step the (partially trained) network 900 is applied to simulated scenarios in a simulator 904, by using the partially trained network 900 to plan trajectories for a simulated ego agent (typically in response to other agent(s) in the scenario). The expert planner $\Omega$ is then applied in shadow mode, i.e. given snapshots $(x_0, O_{0:n}^{1:N}, \Sigma_{0:n}^{1:N})$ of the scenarios encountered in the most recent set of simulations, the reference planner $\Omega$ is used to generate expert trajectories at those time instants, which in turn are used to augment the training set $\mathcal{D}$ for the next training step. Note that the evolution of each simulated scenario is determined, at least in part, by the actions of the partially trained network 900 (for example, at some time into the scenario, $x_0$ would generally depend on earlier actions by the partially trained network 900, as may the other parameters $O_{0:n}^{1:N}, \Sigma_{0:n}^{1:N}$ e.g. in the event the other agents are reacting to the ego agent); the reference planner $\Omega$ then provides expert trajectories for those scenarios (but, unlike the network 900, does not control the ego agent or influence the simulated scenarios, because the aim is to expose the reference planner $\Omega$ to scenarios in which errors by the partially trained network 900 might have accumulated over time).

5) Post-hoc optimisation stage: In the post-hoc optimizer 712, the design of the constrained, non-linear optimisation stage of 2s-OPT is followed to smooth and rectify the trajectory generated by the imitation learning network. More specifically, a discrete bicycle model for the ego vehicle is used:

$$\begin{bmatrix} x_{k+1} \\ y_{k+1} \\ \phi_{k+1} \\ v_{k+1} \end{bmatrix} = \begin{bmatrix} x_k \\ y_k \\ \phi_k \\ v_k \end{bmatrix} + \begin{bmatrix} v_k\cos(\phi_k + \delta_k) \\ v_k\sin(\phi_k + \delta_k) \\ \dfrac{2v_k}{L}\sin(\delta_k) \\ a_k \end{bmatrix} \Delta t \qquad \text{(D-4)}$$

32 where $z_k=[x_k, y_k, \phi_k, v_k]^T$ describes the state of the ego at time k with $(x_k, y_k)$ being the reference-path projected position, $\phi_k$ is the vehicle's yaw angle, and $v_k$ is its speed. $(\alpha_k, \delta_k)$ represent the acceleration and steering controls applied to the vehicle at time k, and L is the distance between axles.

Constraints are enforced that maintain acceleration and steering values within the permitted ranges, limit maximum jerk and angular jerk, and maintain speed within the allowed speed limit for the road. Also, constraints are added that ensure that the corners of the ego vehicle's footprint are at all times bounded within the road surface, and that prevent collision with other road users.

The post-hoc optimizer 712 optimizes a cost function defined as $$J(z_{0:N}, u_{0:N-1}) = \sum_{k=0}^{N}\sum_{i\in I}\omega_i\theta_i(z_k, u_k) \qquad \text{(D-5)}$$

where $\omega_i\in\mathbb{R}$ are scalar weights, and $\theta_i(z_k, u_k)$ are soft constraints that measure deviation from the desired speed, the reference path and the end target location, and that control the norms of acceleration and steering control inputs. Parameters of the optimisation are fine-tuned using grid-search in the parameter space. See Annex B for a more detailed formulation of the optimisation problem.

The output of the imitation learning neural network is used as an initialisation to this optimisation problem. As the NLP solver converges faster when initialised with a feasible solution, as demonstrated in Annex A, the initialisation trajectory is processed to cap abnormal values of calculated speed, acceleration and steering that might break some of the hard constraints. The process is detailed in Annex C.

The described approach poses no restrictions on the design of the optimisation objective that the planner output is desired to respect, while in settings such as [D-20] the optimisation problem should be carefully designed to ensure that the optimisation constraints are differentiable in order for them to be usable to train the planner network.

In general, a function approximator takes the form of one or more trainable models than can be trained to imitate an expert. Those models can take any form, including but not limited to neural network(s). The expert may be a computer-implemented planner (not necessarily required to operate in real-time), as in the above examples. In that case, the one or more models are chosen so that they can be applied with fewer computing resources or memory resources than the expert planner (preferably in real-time). This generally means trading efficiency (time and/or memory efficiency) for accuracy (i.e. the accuracy with which the function approximator is able to imitate the expert)— in the embodiments described above, the trade of is specifically that the trained function approximator may no longer be guaranteed to satisfy the hard constraints on the NLP stage. However, this issue is addressed by implementing the NLP logic at runtime, to refine the initial trajectory produced by the function approximator, and in this context it is not necessary for the trained function approximator to perfectly imitate the expert.

As will be appreciated, whilst the above considers a particular form of multistage optimization-based planner as an expert to be imitated, the function approximator can be trained to implement other types of planner. There are particular benefits when the expert planner has the ability to produce high-quality trajectories, but requires significant computational and/or memory resources to do so.

Reference Path-Based Representation

To simplify the process of defining a planning goal, the global coordinate frame is transformed to a reference path-based representation under an invertible transform $\mathcal{T}$. This representation significantly simplifies the problem of path tracking.

A goal of the ego vehicle is defined as following a differentiable and bounded two-dimensional reference path in the global coordinate frame, $\mathcal{P}_{ref}$, parameterized by the distance from the start of the path ( $X^{\mathcal{P}ref}(\lambda)$, $Y^{\mathcal{P}ref}(\lambda)$). Tangential and normal vectors of the reference path in the global coordinate frame can be obtained at any point $\lambda$ along the path $\mathcal{P}_{ref}$ as $$t_\lambda = \begin{bmatrix} \dfrac{\partial X^{\mathcal{P}ref}(\lambda)}{\partial \lambda} \\ \dfrac{\partial Y^{\mathcal{P}ref}(\lambda)}{\partial \lambda} \end{bmatrix}, \tag{1}$$

$$n_\lambda = \begin{bmatrix} \dfrac{-\partial Y^{\mathcal{P}ref}(\lambda)}{\partial \lambda} \\ \dfrac{\partial X^{\mathcal{P}ref}(\lambda)}{\partial \lambda} \end{bmatrix}$$

respectively.

The reference path $\mathcal{P}_{ref}$ is a path which the ego vehicle is generally intending to follow, at a set target speed. However, deviation from the reference path and target speed, whilst discouraged, are permitted provided that no hard constraints (such as collision avoidance constraints) are breached. The reference path can be determined using knowledge of the road layout, which may use predetermined map data (such as an HD map of the driving area), information from the perception stack 104, or a combination of both. For complex layouts in particular (such as complex junctions or roundabouts), the reference path could be learned by monitoring the behaviour of other drivers in the area over time.

Figures 13A, 13B:
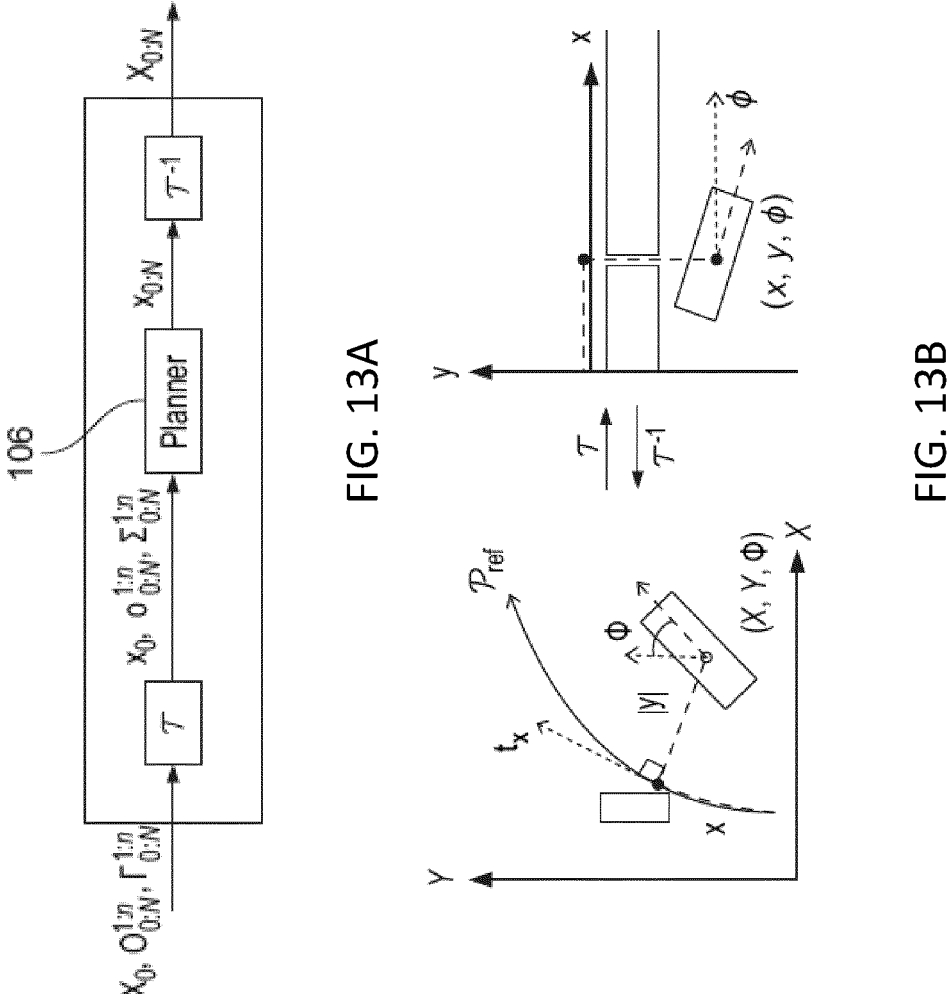
FIG. 13A shows mathematical transformations to and from a reference-path based frame of reference.
FIG. 13B geometrically depicts a representation from a global frame of reference into a reference path-based frame of reference.

FIG. 13A illustrates the process of going from an input $(X_0, O_{0:N}^{1:n}, \Gamma_{0:N}^{1:n})$ to the desired output $X_{0:N}$. Given an input $(X_0, O_{0:N}^{1:n}, \Gamma_{0:N}^{1:n})$ (upper case) the invertible transformation $\mathcal{T}$ is applied to yield $(x_0, o_{0:N}^{1:n}, \Sigma_{0:N}^{1:n})$ (lower case) in the reference path-based representation, which the planner 106 then uses to plan. The output of the planner 106 is an intended trajectory $x_{0:N}$ in the reference path-based representation, which in turn is transformed back to the global coordinate frame by applying the inverse transformation $\mathcal{T}^{-1}$ to obtain $X_{0:N}$ in the global coordinate frame. Further details of the transformation are described below.

The invertible transform $\mathcal{T}$ operates over three types of input: (1) poses, (2) velocities and (3) covariance matrices. Each of the individual operations is described next.

1) Pose transform: $\mathcal{T}$ maps poses $(X, Y, \Phi)$ in the global coordinate frame $\mathcal{W}$ to poses $(x, y, \phi)$ in the reference path frame $\mathcal{W}_r$ as shown in FIG. 13B.

$x=\text{proj } \mathcal{P}_{ref}[X\ Y]$ is the distance of the projection of $[X\ Y]$ to $\mathcal{P}_{ref}$ from the beginning of the path, defined as the solution to the following optimization problem:

$$\underset{\lambda}{\arg\min} \left(X - X^{\mathcal{P}ref}(\lambda)\right)^2 + \left(Y - Y^{\mathcal{P}ref}(\lambda)\right)^2.$$

Due to the nature of the optimization, no closed-form solution can be obtained for x.

$$y = \frac{1}{\|n_x\|} n_x^T \cdot \hat{y},$$

where $n_x$ is the normal vector of the reference path at $\lambda=x$ as in (1), and $$\hat{y} = \begin{bmatrix} X - X^{\mathcal{P}ref}(x) \\ Y - Y^{\mathcal{P}ref}(x) \end{bmatrix}.$$

$$\phi = \angle t_x - \Phi,$$

$$\text{where } \angle t_x = \arctan\left(\frac{\partial Y^{\mathcal{P}ref}(\lambda)}{\partial X^{\mathcal{P}ref}(\lambda)}\bigg|_{\lambda=x}\right)$$

FIG. 13B shows a visual representation of the transform $\mathcal{T}$ between the world frame of reference and the reference path-based frame, and $\mathcal{T}^{-1}$, the inverse transform.

As will be appreciated, the inverse transformation $\mathcal{T}^{-1}$ can be derived straightforwardly by applying the same geometric principles.

2) Velocity transform: since $\mathcal{T}$ is defined spatially, speeds are invariant to it: $v = \mathcal{T}(V)=V$.

3) Covariance transform: considering a traffic participant with pose O and covariance $\Gamma$, such that $\mathcal{T}(O)=[x\ y\ \phi]^T$, the transformed covariance matrix in the reference path coordinate frame is given by:

$$\Sigma = \mathcal{T}(\Gamma)=R(\angle t_x-\phi)\Gamma R(\angle t_x-\phi)^T \tag{2}$$

where $t_x$ is the tangent of $\mathcal{P}_{ref}$ evaluated at $\lambda=x$, and $R \in SO(2)$ is a rotation matrix.

REFERENCES

Reference is also made in the above to the following, each of which is incorporated herein by reference in its entirety:

[D-4] F. Eiras, M. Hawasly, S. V. Albrecht, and S. Ramamoorthy, "Twostage optimization-based motion planner for safe urban driving," arXiv preprint arXiv: 2002.02215, 2020.

[D-17] S. Ross, G. Gordon, and D. Bagnell, "A reduction of imitation learning and structured prediction to no-regret online learning," in Proceedings of the fourteenth international conference on artificial intelligence and statistics, 2011, pp. 627-635.

[D-19] J. Chen, B. Yuan, and M. Tomizuka, "Deep imitation learning for autonomous driving in generic urban scenarios with enhanced safety," in 2019 IEEE/RSJ International Conference on Intelligent Robots and Systems (IROS), 2019, pp. 2884-2890.

[D-20] W. Zhan, J. Li, Y Hu, and M. Tomizuka, "Safe and feasible motion generation for autonomous driving via constrained policy net," in IECON 2017-43rd Annual Conference of the IEEE Industrial Electronics Society, 2017, pp. 4588-4593.

[D-21] T. Tosun, E. Mitchell, B. Eisner, J. Huh, B. Lee, D. Lee, V. Isler, H. S. Seung, and D. Lee, "Pixels to plans: Learning non-prehensile manipulation by imitating a planner," arXiv preprint arXiv:1904.03260, 2019.

[D-23] C. A. Floudas and P. M. Pardalos, State of the art in global optimization: computational methods and applications. Springer Science & Business Media, 2013, vol. 7.

[D-24] J. Nocedal and S. Wright, Numerical optimization. Springer Science & Business Media, 2006.

[D-25] A. Wachter and L. T. Biegler, "On the implementation of an interior-" point filter line-search algorithm for large-scale nonlinear programming," Mathematical programming, vol. 106, no. 1, pp. 25-57, 2006.

[D-26] A. Zanelli, A. Domahidi, J. Jerez, and M. Moran, "Forces nlp: an efficient implementation of interior-point methods for multistage nonlinear nonconvex programs," International Journal of Control, pp. 1-17, 2017.

[D-27] A. L. Friesen and P. Domingos, "Recursive decomposition for nonconvex optimization," arXiv preprint arXiv:1611.02755, 2016.

[D-28] T. S. Lembono, A. Paolillo, E. Pignat, and S. Calinon, "Memory of motion for warm-starting trajectory optimization," IEEE Robotics and Automation Letters, vol. 5, no. 2, pp. 2594-2601, 2020.

[D-29] M. Mirman, T. Gehr, and M. Vechev, "Differentiable abstract interpretation for provably robust neural networks," in International Conference on Machine Learning, 2018, pp. 3578-3586.

[D-30] E. W. Ayers, F. Eiras, M. Hawasly, and I. Whiteside, "PaRoT: A practical framework for robust deep neural network training," in NASA Formal Methods. Springer International Publishing, 2020, pp. 63-84.

[D-31] C. Liu, T. Arnon, C. Lazarus, C. Barrett, and M. J. Kochenderfer, "Algorithms for verifying deep neural networks," arXiv preprint arXiv:1903.06758, 2019.

[D-32] D. P. Kingma and J. Ba, "Adam: A method for stochastic optimization," arXiv preprint arXiv:1412.6980, 2014.

The invention claimed is:

1. A computer-implemented method of evaluating performance of a target planner for an ego robot in a real or simulated scenario, the method comprising:

receiving evaluation data for evaluating the performance of the target planner in the scenario, the evaluation data generated by:

applying the target planner at incrementing planning steps, in order to compute a series of ego plans that respond to changes in the scenario, the series of ego plans being implemented in the scenario to cause changes in an ego state the evaluation data comprising:

the ego plan computed by the target planner at one of the planning steps, and a scenario state at a time instant of the scenario, wherein the evaluation data is used to evaluate the target planner by:

computing a reference plan for said time instant based on the scenario state, the scenario state including the ego state at that time instant as caused by implementing one or more preceding ego plans of the series of ego plans computed by the target planner, and computing at least one evaluation score for comparing the ego plan with the reference plan, wherein implementing the series of ego plans comprises, for each ego plan, generating control signals for controlling the ego robot.

2. The method of claim 1, wherein the ego plans take a form of instantaneous ego trajectories, wherein the instantaneous ego trajectory at said planning step extends further in time than a next planning step, and is only partially implemented in the scenario up to the next planning step before the instantaneous ego trajectory of the next planning step is computed;

wherein the reference plan takes the form of an instantaneous reference trajectory, the at least one evaluation score for comparing the instantaneous ego trajectory with the instantaneous reference trajectory.

3. The method of claim 1, wherein said planning step occurs at said time instant of the scenario, wherein the ego plan and the reference plan are both computed based on the scenario state at that time instant.

4. The method of claim 3, wherein:

the ego plans take a form of instantaneous ego trajectories, wherein the instantaneous ego trajectory at said planning step extends further in time than a next planning step, and is only partially implemented in the scenario up to the next planning step before the instantaneous ego trajectory of the next planning step is computed;

the reference plan takes the form of an instantaneous reference trajectory, the at least one evaluation score for comparing the instantaneous ego trajectory with the instantaneous reference trajectory; and the instantaneous ego trajectory and the instantaneous reference trajectory both extend beyond the next planning step.

5. The method of claim 1, wherein said time instant is later than said planning step, such that the reference plan takes into account changes in the scenario since that planning step that are embodied in the scenario state.

6. The method of claim 1, wherein the target planner is constrained to operate in real-time, and the reference plan is not computed in real-time.

7. The method of claim 1, wherein more computing resources and/or memory resources are allocated to compute the reference plan than are granted to the target planner for computing the ego plan.

8. The method of claim 1, wherein the reference plan is computed by applying a reference planner to the scenario state at said time instant.

9. The method of claim 8, wherein the reference planner is a constrained optimization-based planner.

10. The method of claim 8, wherein said planning step occurs at said time instant of the scenario, wherein the ego plan and the reference plan are both computed based on the scenario state at that time instant, wherein the scenario state at said time instant of said planning step comprises or is derived from a current set of observations used by the target planner to compute the ego plan, wherein the reference planner uses a same set of observations to compute the reference plan.

11. The method of claim 10, wherein the observations are noisy observations subject to real or modelled observation errors, wherein the target and reference planners are both subject to a same observation errors; or the observations are simulated observations without any observation error, such that neither the target nor the reference planner is subject to observation error.

12. The method of claim 1, wherein said planning step occurs at said time instant of the scenario, wherein the ego plan and the reference plan are both computed based on the scenario state at that time instant, wherein the ego plan is computed by the target planner from a set of observations subject to modelled perception errors, and the reference plan is computed from a same observations but without the modelled perception errors.

13. The method of claim 1, wherein the evaluation data comprises instantaneous ego plans computed at multiple planning steps of the incrementing planning steps, and multiple scenario states, each associated with one of the multiple planning steps;

wherein a reference plan is computed for each of the multiple planning steps based on the associated scenario state at that planning step, and at least one evaluation score is computed for each of the multiple planning steps for comparing the ego and reference plans of that planning step.

14. The method of claim 1, wherein the at least one evaluation score comprises an individual evaluation score computed for the target plan and an individual evaluation score computed for the reference plan, the individual evaluation scores computed with respect to a common metric that quantifies safety, comfort or progress in relation to a defined goal; or wherein the at least one evaluation score comprises a comparative score quantifying a difference between the target and reference plans with respect to a comparison metric that quantifies safety, comfort or progress in relation to a defined goal.

15. The method of claim 1, wherein the target and reference plans are computed with a common objective of fulfilling a defined goal.

16. The method of claim 1, comprising the step of outputting the evaluation score at a user interface, with a visual representation of the scenario, and a visual representation of the ego and reference plans.

17. The method of claim 1, wherein the reference plan is computed by applying a reference planner to the scenario state at said time instant, wherein the target planner comprises one or more trainable modes, and the evaluation data provides one or more training examples that are used to train a target planer to imitate the reference planner, the evaluation score being a component of a cost function that measures deviation between ego plans computed by the target planner and reference plans computed by the reference planner, the training performed with an objective of minimizing those deviations.

18. A non-transitory medium embodying computer-readable instructions for training a target planner to imitate an expert planner for an ego robot, the computer-readable instructions configured, upon execution by one or more processors, to cause operations of:

applying the target planner in a simulated scenario at incrementing planning steps, in order to compute a series of ego plans that respond to changes in the scenario, the series of ego plans being implemented in the scenario to cause changes in an ego state;

computing an expert plan for at least one of the planning steps, by applying the expert planner to a scenario state at that planning step;

using the scenario state and the expert plan as a training example, to train one or more models of the target planner to imitate the expert planner, the training performed with an objective of minimizing deviation between the ego plan computed by the target planner when applied to that scenario state and the expert plan computed by the expert planner when applied to that scenario state, the scenario state including the ego state at said planning step as caused by implementing one or more preceding ego plans of the series of ego plans computed by the target planner; and generating, based on output of the trained models of the target planner, control signals for controlling an ego robot.

19. A computer system for evaluating a performance of a target planner for an ego robot in a simulated scenario, the computer system comprising:

one or more computers configured to implement operations of:

receiving evaluation data for evaluating performance of the target planner, the evaluation data generated by applying the target planner in a first instance of the scenario from an initial scenario state at first incrementing planning steps, in order to compute a series of ego plans that respond to changes in the first instance of the scenario, a first series of ego plans being implemented in the first instance of the scenario to cause changes in a first ego state, wherein an actual ego trajectory is defined by the changes in the first ego state over a duration of the first instance of the scenario, the evaluation data comprising the initial scenario state and the actual ego trajectory;

wherein the one or more computers are configured to use the evaluation data to evaluate the target planner by:

applying a reference planner in a second instance of the scenario from a same initial scenario state at second incrementing planning steps, in order to compute a series of reference plans that respond to changes in the second instance of the scenario, the series of reference plans being implemented in the second instance of the scenario to cause changes in a second ego state, wherein an actual reference trajectory is defined by the changes in the second ego state over a duration of the second instance of the scenario, and computing at least one evaluation score for comparing the actual ego trajectory with the actual reference trajectory;

wherein implementing the series of ego plans comprises, for each ego plan, generating control signals for controlling the ego robot, and wherein implementing the series of reference plans comprises, for each reference plan, generating control signals for controlling the ego robot.

20. The computer system of claim 19, wherein the ego plans take a form of instantaneous ego trajectories, wherein the instantaneous ego trajectory of at least one planning step of the first series of planning steps extends further in time than next planning step, and is only partially implemented in the first instance of the scenario up to the next planning step before the instantaneous ego trajectory of the next planning step is planned, the actual ego trajectory defined not by any individual one of the instantaneous ego trajectories but by the changes in the first ego state over the duration of the scenario;

wherein the reference plans take the form of instantaneous reference trajectories, wherein the instantaneous reference trajectory of at least one planning step of the second series of planning steps extends further in time than the next planning step, and is only partially implemented up to the next planning step before the instantaneous reference trajectory of the next planning step is computed, the actual reference trajectory defined not by any individual one of the instantaneous reference trajectories but by the changes in the second ego state over the duration of the scenario.

\* \* \* \* \*